United States Patent [19]

Hunsberger et al.

[11] 4,231,087

[45] Oct. 28, 1980

[54] MICROPROCESSOR SUPPORT SYSTEM

[75] Inventors: Dennis J. Hunsberger, Fair Haven; Charles E. Nahabedian, Mendham; Thomas M. Quinn, Little Silver; James H. VanOrnum, Hazlet, all of N.J.

[73] Assignee: Bell Telephone Laboratories, Incorporated, Murray Hill, N.J.

[21] Appl. No.: 952,278

[22] Filed: Oct. 18, 1978

[51] Int. Cl.³ ............................................. G06F 11/00
[52] U.S. Cl. .................................. 364/200; 364/900; 371/16
[58] Field of Search ............... 364/200, 900; 235/302, 235/304, 304.1, 304.2; 371/15, 16, 19

[56] References Cited

U.S. PATENT DOCUMENTS

| | | | |
|---|---|---|---|
| 4,084,233 | 4/1978 | Handly et al. | 364/200 |
| 4,093,981 | 6/1978 | McAllister et al. | 364/200 |
| 4,099,234 | 7/1978 | Woods et al. | 364/200 |
| 4,100,601 | 7/1978 | Kaufman et al. | 364/200 |
| 4,103,328 | 7/1978 | Dalmasso | 364/200 |

OTHER PUBLICATIONS

Ritchie and Thompson, The UNIX Time-Sharing System, Communications of the ACM, Jul. 1974, vol. 17, No. 7, pp. 365-375.

Primary Examiner—Charles E. Atkinson
Attorney, Agent, or Firm—James M. Graziano

[57] ABSTRACT

The disclosed microprocessor support system provides a total "laboratory" environment for developing and testing application software as well as for debugging the microprocessor-based application machine itself. The microprocessor support system contains a time shared minicomputer equipped with a full set of peripherals which functions as the main or operating system. A data link connects this operating system with test equipment located at the site of the application machine. This test equipment consists of a field test unit which provides an interface between the application machine, a local keyboard terminal and the operating system such that an engineer at the site of the application machine has access through the field test unit to both the microprocessor-based application machine and the operating system with its sophisticated hardware and software resources to assist in developing and testing application software, as well as debugging the application machine itself.

18 Claims, 23 Drawing Figures

| FIG. 8 | FIG. 9 |

FIG. 17

MATCHER CCT ENABLE RAM 1103

| ADDRESS | | | | OUTPUT | | | |
|---|---|---|---|---|---|---|---|
| A3 | A2 | A1 | A0 | | | | |
| M4 | M3 | M2 | M1 | E1 | E2 | E3 | E4 |
| 0 | 0 | 0 | 0 | 0 | 1 | 1 | 1 |
| 0 | 0 | 0 | 1 | 1 | 0 | 1 | 1 |
| 0 | 0 | 1 | 0 | 1 | 1 | 1 | 1 |
| 0 | 0 | 1 | 1 | 1 | 1 | 1 | 1 |
| 0 | 1 | 0 | 0 | 1 | 1 | 1 | 1 |
| 0 | 0 | 0 | 1 | 1 | 1 | 1 | 1 |
| 0 | 1 | 1 | 0 | 1 | 1 | 1 | 1 |
| 0 | 1 | 1 | 1 | 1 | 1 | 1 | 1 |
| 1 | 0 | 0 | 0 | 1 | 1 | 1 | 1 |
| 1 | 0 | 0 | 1 | 1 | 1 | 1 | 1 |
| 1 | 0 | 1 | 0 | 1 | 1 | 1 | 1 |
| 1 | 0 | 1 | 1 | 1 | 1 | 1 | 1 |
| 1 | 1 | 0 | 0 | 1 | 1 | 1 | 1 |
| 1 | 1 | 0 | 1 | 1 | 1 | 1 | 1 |
| 1 | 1 | 1 | 0 | 1 | 1 | 1 | 1 |
| 1 | 1 | 1 | 1 | 1 | 1 | 1 | 1 |

FIG. 21

MATCHER CCT CONTROL RAM 1106

| ADDRESS | | | | OUTPUT | | | |
|---|---|---|---|---|---|---|---|
| | | | | D1 | D2 | D3 | D4 |
| M4 | M3 | M2 | M1 | SPARE | MMC | TFTC | ETCC |
| 0 | 0 | 0 | 0 | 0 | 0 | 0 | 0 |
| 0 | 0 | 0 | 1 | 0 | 0 | 0 | 1 |
| 0 | 0 | 1 | 0 | 0 | 0 | 0 | 0 |
| 0 | 0 | 1 | 1 | 0 | 0 | 0 | 0 |
| 0 | 1 | 0 | 0 | 0 | 0 | 0 | 0 |
| 0 | 1 | 0 | 1 | 0 | 0 | 0 | 0 |
| 0 | 1 | 1 | 0 | 0 | 0 | 0 | 0 |
| 0 | 1 | 1 | 1 | 0 | 0 | 0 | 0 |
| 1 | 0 | 0 | 0 | 0 | 0 | 0 | 0 |
| 1 | 0 | 0 | 1 | 0 | 0 | 0 | 0 |
| 1 | 0 | 1 | 0 | 0 | 0 | 0 | 0 |
| 1 | 0 | 1 | 1 | 0 | 0 | 0 | 0 |
| 1 | 1 | 0 | 0 | 0 | 0 | 0 | 0 |
| 1 | 1 | 0 | 1 | 0 | 0 | 0 | 0 |
| 1 | 1 | 1 | 0 | 0 | 0 | 0 | 0 |
| 1 | 1 | 1 | 1 | 0 | 0 | 0 | 0 |

| ADDRESS | OUTPUT | | | |
|---|---|---|---|---|
| A3 A2 A1 A0 | D1 | D2 | D3 | D4 |
| 0 0 0 0 | 1 | 1 | 1 | 1 |
| 0 0 0 1 | 1 | 1 | 1 | 1 |
| 0 0 1 0 | 1 | 1 | 1 | 1 |
| 0 0 1 1 | 1 | 1 | 1 | 1 |
| 0 1 0 0 | 1 | 1 | 1 | 1 |
| 0 1 0 1 | 1 | 1 | 1 | 1 |
| 0 1 1 0 | 1 | 1 | 1 | 1 |
| 0 1 1 1 | 1 | 1 | 1 | 1 |
| 1 0 0 0 | 1 | 1 | 1 | 1 |
| 1 0 0 1 | 1 | 1 | 1 | 1 |
| 1 0 1 0 | 1 | 1 | 1 | 1 |
| 1 0 1 1 | 1 | 1 | 1 | 1 |
| 1 1 0 0 | 1 | 1 | 1 | 1 |
| 1 1 0 1 | 0 | 1 | 1 | 1 |
| 1 1 1 0 | 1 | 1 | 1 | 1 |
| 1 1 1 1 | 1 | 1 | 1 | 1 |

| ADDRESS | OUTPUT | | | |
|---|---|---|---|---|
| A3 A2 A1 A0 | D1 | D2 | D3 | D4 |
| 0 0 0 0 | 1 | 1 | 1 | 1 |
| 0 0 0 1 | 1 | 1 | 1 | 1 |
| 0 0 1 0 | 1 | 1 | 1 | 1 |
| 0 0 1 1 | 1 | 1 | 1 | 1 |
| 0 1 0 0 | 0 | 1 | 1 | 1 |
| 0 1 0 1 | 0 | 1 | 1 | 1 |
| 0 1 1 0 | 0 | 1 | 1 | 1 |
| 0 1 1 1 | 0 | 1 | 1 | 1 |
| 1 0 0 0 | 1 | 1 | 1 | 1 |
| 1 0 0 1 | 1 | 1 | 1 | 1 |
| 1 0 1 0 | 1 | 1 | 1 | 1 |
| 1 0 1 1 | 1 | 1 | 1 | 1 |
| 1 1 0 0 | 0 | 1 | 1 | 1 |
| 1 1 0 1 | 0 | 1 | 1 | 1 |
| 1 1 1 0 | 0 | 1 | 1 | 1 |
| 1 1 1 1 | 0 | 1 | 1 | 1 |

MICROPROCESSOR SUPPORT SYSTEM

FIELD OF THE INVENTION

This invention pertains to a microprocessor-based application system and in particular to a microprocessor-based field test unit connected to the application system which enables an engineer at the site of the application system to access a centrally located minicomputer equipped with sophisticated hardware and software resources to assist in the on-site development and testing of application software for the application system. In addition, the microprocessor-based field test unit enables the on-site engineer to perform hardware testing routines to debug the application system hardware.

BACKGROUND OF THE INVENTION

The availability of inexpensive microprocessors has caused a proliferation of microprocessor-based application systems, since the microprocessor enables the circuit designer to place a great deal of intelligence in the application system at little cost. However, this configuration has introduced a new cost into system development, and that is the cost of developing and maintaining application software. As applications become increasingly more sophisticated, the software required will become more complex and its development will become more costly.

To generate and debug sophisticated microprocessor software requires good tools. The basic and invaluable tools, such as assemblers, simulators, breadboards, etc., are well known and are available from microprocessor vendors. However, vendor supplied development systems which utilize prior art tools are ill-adapted to produce nontrivial amounts of high quality microprocessor software. Prior art microprocessor support systems which run on a large batch process time-shared computer are incapable of being directly connected to the application microprocessor.

The output of these systems is an object module which serves as an input to a microprocessor simulator or is used to produce a portable output, generally paper or magnetic tape. The microprocessor simulator runs on the batch process system and produces a crude indication of the real-time code execution by the application microprocessor. However, the simulator is not an exact replica of the application microprocessor and merely approximates its operation. Additionally, the simulator cannot reproduce the actual operating environment, such as the real world input/output that is applied to the application system. Therefore, the simulator is only effective in testing the software generated for logical consistency and not for actual utility on an operating application system.

Another type of microprocessor software development involves the use of a "Microcomputer Based Development System" (MBDS). In this situation, the MBDS contains a microprocessor which runs an operating system to support some small scale peripherals, a floppy disc for mass storage, and an In Circuit Emulator for testing the software. The disadvantages of this system are that the data base is small due to the limitations imposed by the floppy disc and the system also lacks portability. Additionally, the microprocessor lacks "computing power" and can only run a primitive operating system with limited file management and document production capabilities. Furthermore, operation of the application system must be terminated before the In Circuit Emulator can be plugged into the application system in place of the application system microprocessor. The Emulator will approximate the operation of this microprocessor and debugging of the application system entails stopping the application system operation whenever the MBDS microprocessor must process data. Thus, the MBDS is essentially a single user test system for testing application systems whose operation can be interrupted. This type of system is obviously inapplicable to situations where the application system operation is uninterruptable, such as a business communication system.

SUMMARY OF THE INVENTION

The disclosed microprocessor support system consists of a set of hardware and software tools designed to provide a total "laboratory" environment for developing and testing application software as well as debugging the application system itself. The microprocessor support system contains a centrally located time-shared minicomputer equipped with a full complement of peripherals which function as the main or operating system. The time-shared minicomputer is provided with a data link, which enables the operating system to communicate with test equipment located at the site of the application system. This remotely located test equipment consists of a field test unit which interfaces to the time-shared minicomputer via a data link, to a local keyboard terminal, and to the application system. Thus, an engineer at the application system has access, through the field test unit, to both the application system and the time-shared minicomputer operating system with its associated sophisticated operating system and hardware resources to assist him in developing and testing the application software as well as in debugging the application system hardware.

The disclosed field test unit contains a microprocessor, transfer trace, matcher, elapsed time clock, and mimic memory hardware and software debugging aids. The field test unit can receive new or modified application software from the operating system or can retrieve and modify the application software from the application system itself. Also, the application system can be run under normal operating conditions or the field test unit can cause the application microprocessor to execute new application software stored in the field test unit's common memory. This enables the engineer to modify the application software external to the application system, and then run the application system with the modified software, observing the results, before altering the application system memory. The engineer also can run sophisticated trouble locating routines on the application system to aid in locating hardware faults in the application system. The application system can be controlled and monitored either by the field test unit on-site or over the data link by the operating system from the central location. In either case, an engineer at either location has access to the full complement of sophisticated hardware and software facilities that are available on the centrally located time-shared minicomputer operating system.

Therefore, the microprocessor engineer has at his command a powerful tool in a complete on-line "laboratory" to aid him in generating sophisticated microprocessor application software and in debugging the application system hardware while the application system is in its operating environment. The time-shared minicomputer runs a sophisticated operating system and supports a large disc for mass storage, high speed sophisticated peripherals as well as multiple users and multiple field test units (FTUs) for concurrently debugging a number of application systems at various locations. The time-shared minicomputer has ample "computing power" to run a sophisticated operating system with file management, documentation, editing facilities as well as having the advantage of a large common data base accessable by the multitude of users. The FTUs associated with the time-shared minicomputer are portable and can operate without disrupting the service provided by the application system. The disclosed microprocessor support system is therefore more efficient than prior art microprocessor support systems which provide neither the power of a minicomputer support system nor an integrated "laboratory" environment directly connected to the application system when it is in use in the field. These capabilities are all provided by the sophisticated microprocessor-based FTU through its remote access and interface functions.

Thus, the disclosed microprocessor support system eliminates the disadvantages of prior art software support systems by providing access to a high level language and other powerful software development tools, while allowing the user to debug his programs on the application system hardware. The disclosed support system enables an engineer to access both the sophisticated software and the peripheral devices of a main minicomputer operating system to generate the microprocessor application software. The disclosed microprocessor development system also has the capability to selectively link software modules together to produce a complete application system software package and load this complete software system into the application system hardware. Furthermore, it enables programmers to: debug the application software using an interactive symbollic debugger, document the software through the use of the minicomputer text formatting routines, communicate with other users, in addition to providing the facilities to permit an engineer to directly test, operate and monitor the application system hardware in its actual operating condition either from the central location or from the site of the application system.

BRIEF DESCRIPTION OF THE DRAWING

The operation of the present invention will be more fully apparent from the following description of the drawing, in which:

FIGS. 3-16 are a detailed circuit diagram of a preferred embodiment of the invention wherein:

FIG. 3 is a detailed circuit diagram of the receiver circuit,

FIGS. 4 and 5 are a detailed circuit diagram of the Arbiter circuit,

FIG. 6 is a detailed circuit diagram of the Sanity and Receiver circuit and the interface circuit, FIG. 7 is a detailed circuit diagram of the FTU program store, FIGS. 8 and 9 are a detailed circuit diagram of the FTU microprocessor, FIGS. 10-12 are a detailed circuit diagram of the Matcher circuits, FIG. 13 is a detailed circuit diagram of the Transfer Trace and PROM programmer circuits, FIG. 14 illustrates how to connect FIGS. 10-12.

FIG. 15 illustrates the memory map of common memory,

FIG. 16 is a detailed circuit diagram of Common and Mimic Memory circuits;

FIGS. 17-21 show an example of how the various RAM devices are programmed;

FIG. 22 illustrates how to connect FIGS. 8 and 9; and

FIG. 23 illustrates how to connect FIGS. 3-5.

Figure 1:
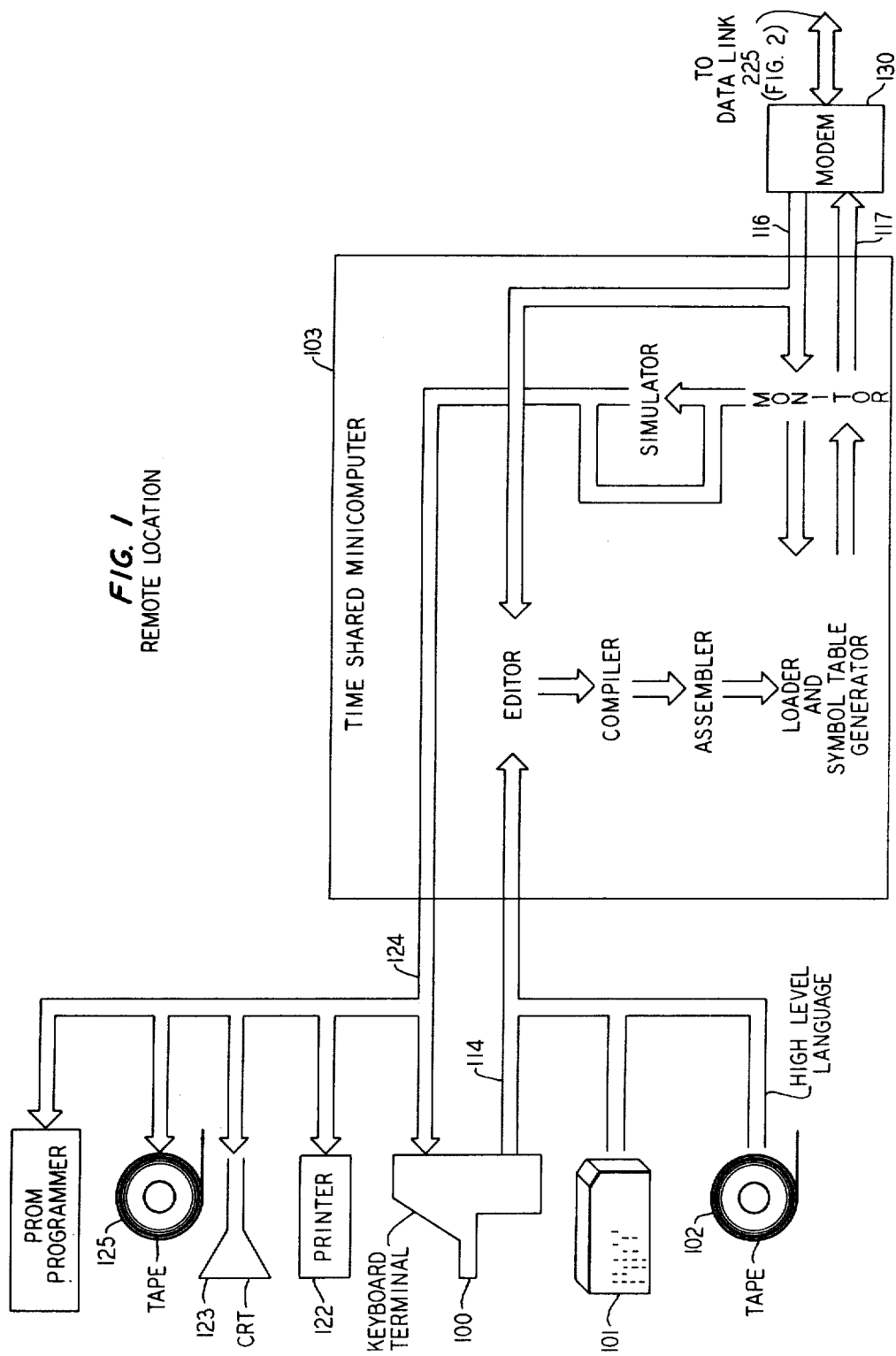
FIGS. 1 and 2 illustrate an embodiment of the invention in block diagram form.
Figure 2:
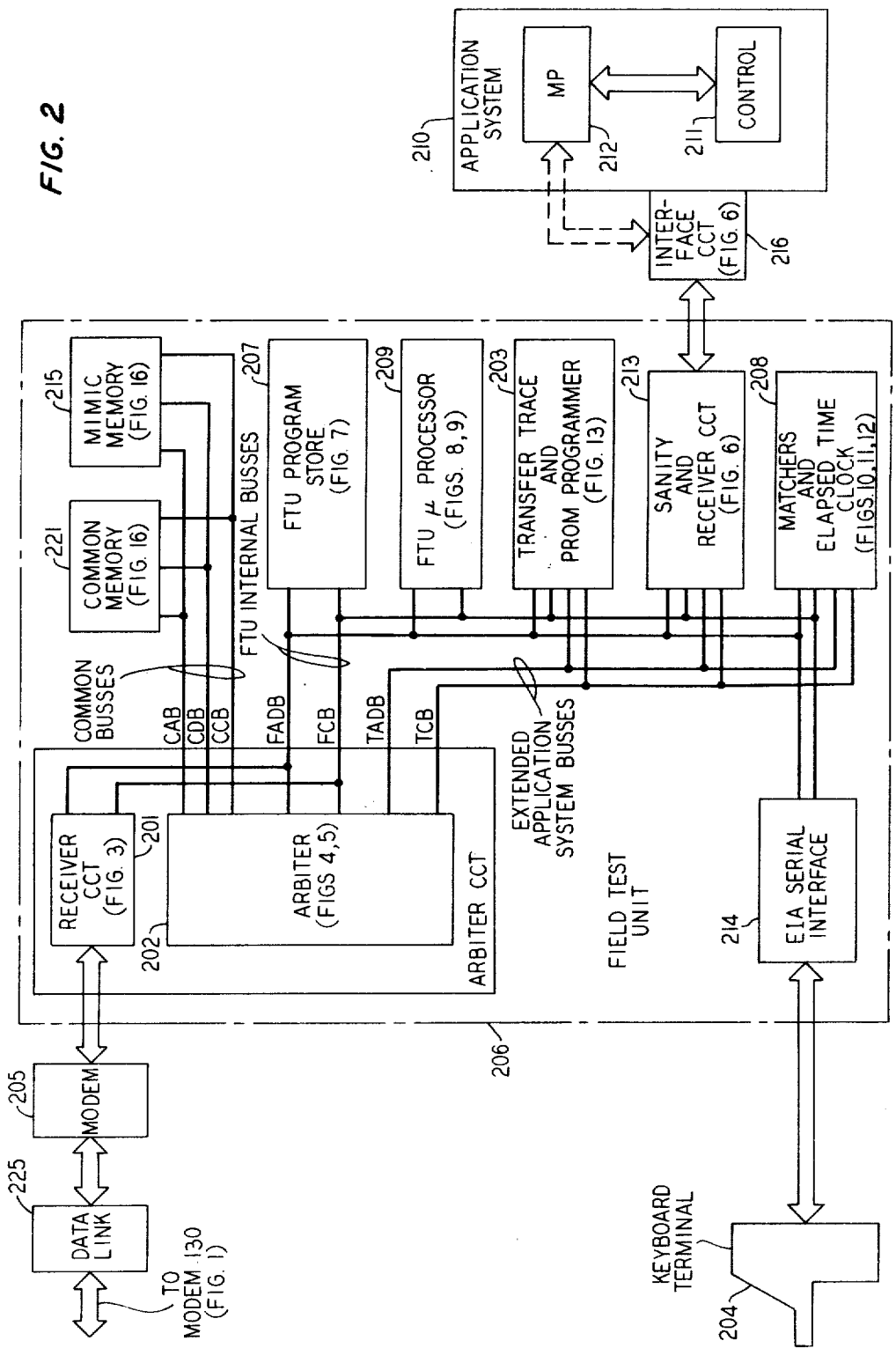

GENERAL DESCRIPTION—FIGS. 1 and 2

FIGS. 1 and 2 show one embodiment of our invention in block diagram form wherein a time-shared minicomputer 103 is connected via field test unit 206 to an application system 210. Time-shared minicomputer 103 can receive input data from keyboard terminal 100 and/or computer cards 101 and/or tape 102 and/or any other suitable computer input device. These devices are all connected by cable 114 to time-shared minicomputer 103 wherein machine language instructions are generated in standard fashion from data received from these various input devices under control of standard computer programs. The generation of machine language instructions is accomplished on time-shared minicomputer 103 in well known fashion by having a high level language input via the editor program whose output is processed by the compiler program whose output in turn is processed by the assembler program to generate relocatable machine language instructions which are processed by a loader program to produce a final set of machine language instructions executed by application system 210. Since minicomputer 103 operates on a time-shared basis, a plurality of engineers may concurrently avail themselves of the time-shared minicomputer facilities to each generate a set of machine language instructions for application system microprocessor 212. However, for convenience sake, only one set of peripheral devices and only one data-modem/field-test-unit combination are shown. In an actual operating situation, a plurality of field test units would be connected to time-shared minicomputer 103 with each field test unit controlling an associated application system.

TIME-SHARED MINICOMPUTER 103—FIG. 1

Time-shared minicomputer 103 can be any one of the numerous commercially available minicomputer systems. In the disclosed embodiment, applicants employed a Digital Equipment Corporation PDP 11/70 computer, which is described in the Digital Equipment Corporation's "PDP 11/70 Processor Handbook", copyrighted in 1975. As previously mentioned, numerous peripheral devices are connected to time-shared minicomputer 103 to provide various forms of input and output. For the sake of simplicity, emphasis will be placed on the use of a printing keyboard terminal 100 which is employed as both an input and an output device. Thus, an engineer at the main location can communicate with time-shared minicomputer 103 via keyboard terminal 100.

TIME-SHARED MINICOMPUTER OPERATING SYSTEM

Time-shared minicomputer 103 is, of course, supplied with an operating system program as well as an associated set of editor, compiler, assembler and loader programs. The operating system program employed in the disclosed embodiment is the commercially available UNIX program which is described both in an article by D. M. Ritchie and K. L. Thompson entitled "The UNIX Time-sharing System", which appeared in Volume 17, Number 17 of the *Communications of the ACM* on pages 365–375 in July, 1974 as well as in articles by the same authors and their associates which appeared in Volume 57, Number 6 of the *Bell System Technical Journal* on pages 1905–2209 in July, 1978. The UNIX program provides the basic operating system on which the editor, compiler, assembler and loader programs can be run. The UNIX system also provides the documentation support for these programs, thereby enabling the engineer to obtain a hard copy listing of the programs run as well as the changes implemented therein. The compiler program employed in the disclosed embodiment is a version of the SMAL language which is described in an article entitled "SMAL -A Structured Macro/Assembly Language for a Microprocessor" by C. Popper in the Digest of Papers for IEEE COMPCON, August, 1974, pages 147 to 151. The SMAL2 language combines the ease of using a high level compiler with the efficiency of an assembly language. The SMAL2 language has a rich set of control structures (If-Else, While, Do-While, Switch) which allow a programmer to use natural compiler notations to describe algorithms. The SMAL2 compiler has been tailored to be used in conjunction with the Intel Corporation 8080-type microprocessor which microprocessor is described in the Intel Corporation's "8080 Microcomputer Systems User's Manual" copyrighted in 1976. Thus, the output of the SMAL2 compiler is then converted to system language for use in the 8080-type microprocessor by standard assembler and loader programs, which are well known in the art, to create an absolute addressed object module and its associated symbol table. The object module consists of the machine language instructions for the 8080-type microprocessor.

Thus, the engineer at keyboard terminal 100 can design software to be used on an 8080-type microprocessor by accessing the operating system of time-shared minicomputer 103 and generating an object module which can be directly loaded into an appropriate memory device for use by an 8080-type microprocessor.

When an engineer generates a suitable set of machine language instructions on time-shared minicomputer 103, these machine language instructions may be tested by a simulator program the output of which may be directed to an output device such as a printing keyboard terminal 100, printer 122, CRT 123, or any other suitable output device connected to time-shared minicomputer 103 by cable 124. Alternatively, the machine language instructions may be tested by having application system 210 execute these instructions.

APPLICATION MACHINE 210

Application system 210 can be any of the multitude of microprocessor controlled systems presently found in a business environment, such as a point of sale terminal, a ticket system, a telephone switching sytem, etc. The one required element in application system 210 is that it contains a microprocessor 212. In the present disclosure, application system microprocessor 212 will be assumed to be an Intel Corporation model 8080 microprocessor. The model 8080 microprocessor, in most applications, requires the use of buffers to supply the required drive current to activate the various control leads, data and address buses. Therefore, it is also assumed that application system microprocessor 212 is buffered in the standard fashion well known in the art.

Application system microprocessor 212 is also connected to Control circuit 211 which comprises various control and "sanity" circuits which are also referred to in the literature variously as recovery circuits, execution control circuits, or processor fault monitoring circuits. The sanity circuit functions to prevent external conditions and/or input control signals from disabling the associated microprocessor by placing it in a nonrecoverable state. The sanity circuit monitors the input signals as well as the microprocessor operation and acts to reset or rescue the microprocessor whenever it exhibits a berrant operation or whenever the input signals would improperly disrupt normal microprocessor operation. Thus, any external test system that attempts to monitor, and/or control, and/or debug the operation of application system microprocessor 212 must first deal with the sanity circuit which may be operating at cross purposes with the external test system.

PROGRAM TRANSFER

In the disclosed embodiment, testing of application system 210 is accomplished by the engineer activating time-shared minicomputer 103 through keyboard terminal 100 or 204 to execute a monitor program which will load the machine language instructions into field test unit 206 via the data channel between time-shared minicomputer 103 and field test unit 206. The data channel consists of a pair of data modems 205, 130 and a bidirectional data link 225, such as a telephone line, between time-shared minicomputer 103 and field test unit 206. Data is transferred from time-shared minicomputer 103 to a standard 300 baud data modem 130 on conductors 117 and data modem 130 forwards this data to data modem 205 of field test unit 206 via data link 225. In return, data modem 205 of field test unit 206 transfers data to data modem 30 via data link 225 and date modem 130 forwards this data to time-shared minicomputer 103 on conductors 116. The monitor program in time-shared minicomputer 103 orders the data flow to and from data modem 130 over connections 116 and 117. Therefore, machine language instructions generated on time-shared minicomputer 103 can be transferred to field test unit 206 via data modem 130 and data link 225.

FIELD TEST UNIT 206

Field test unit 206 contains numerous circuits which are all connected together by a system of data, address and control buses. In particular, common address bus CAB, common data bus CDB, and common control bus CCB, connect the memory circuits—Common Memory 221 and Mimic Memory 215—to the other field test unit circuits by way of Arbiter circuit 202. Also, the application system control bus TCB and address and data bus TADB, as extended to field test unit 206 by Interface circuit 216, are routed to the various control and data collection circuits of field test unit 206. Finally, field test unit internal control bus FCB and address and data bus FADB are directly connected to all field test unit circuits for control and data transfer purposes. Thus, field test unit 206 is comprised of a number of somewhat independent control, data storage and interface circuits which circuits operate cooperatively and communicate with each other via the above-mentioned system of buses.

Thus, the machine language instructions transmitted over data link 225 to field test unit 206 are received by field test unit Receiver circuit 201 which converts the incoming EIA formatted data to a format usable by FTU microprocessor 209. If the machine language instructions being transmitted by time-shared minicomputer 103 are to be executed by FTU microprocessor 209, they will be stored in FTU Program Store 207. This is accomplished by Arbiter 202 connecting the FTU internal buses FADB, FCB to the common buses CAB, CDB, CCB to thereby route the incoming data to FTU Program Store 207 and store the data therein. FTU microprocessor 209 can then access and execute these machine language instructions to test application system 210 which is connected to FTU 206 via Interface Circuit 216 and Sanity and Receiver circuit 213. If the machine language instructions transmitted by time-shared minicomputer 103 were to be executed by application system 210, FTU microprocessor 209 will store the received instructions in Common Memory 221 for use by application system 210. Using these two approaches, FTU 206 can effectively test both the hardware of application system 210 as well as the execution of new software by application system 210.

HARDWARE MAINTENANCE

The use of FTU microprocessor 209 in field test unit 206 enables an engineer to run sophisticated hardware testing routines on field test unit 206 to debug hardware problems in application system 210. The data link connected to time shared minicomputer 103 provides access to a complete file of debugging routines stored in time-shared minicomputer 103, any of which can be transmitted via the data link to field test unit Program Store 207. FTU microprocessor 209 can then execute the debugging routines, monitoring application system 210 with Matchers and Elapsed Time Clock 208, Transfer Trace 203, and Mimic Memory 215 to detect any flaws in application system 210 hardware operation. Alternatively, the data transmitted via data link 225 to FTU 206 can be placed in Common Memory 221. Any debugging routines stored in Common Memory 221 can be accessed by application system microprocessor 212. Thus, field test unit 206 can cause application system microprocessor 212 to execute various exercise and trouble detection routines stored in Common Memory 221 to thereby isolate and detect hardware faults in application system 210.

SOFTWARE DEVELOPMENT

In somewhat analogous fashion, field test unit 206 can be utilized to develop and test software for application system 210. As previously mentioned, application software can be stored in Common Memory 221. Application system microprocessor 212 can access this software by having Arbiter 202 connect extended application system buses TADB, TCB to common buses CAB, CDB, CCB thereby enabling application system 210 to access and execute the instructions stored in Common Memory 221. The new application software can then be monitored by the use of hardware/software debugging aids provided by FTU 206. Monitoring may be controlled at the site of application system 210 via local keyboard terminal 204 which is connected to field test unit 206 via a standard EIA Serial Interface 204 or monitoring may be controlled remotely over data link 225 by keyboard terminal 100 connected to time-shared minicomputer 103.

LABORATORY DEVELOPMENT

While all the previous discussion has been concerned with a remotely located application system, the disclosed microprocessor support system is also capable of being operated in the same location as the application system. For example, for the initial stages of the laboratory development of an application system the disclosed microprocessor support system can be used to generate the software for the new system as well as debug prototype hardware. In this situation, the data link between time-shared minicomputer 103 and FTU 206 would be simply a multiwire cable, directly connecting field test unit 206 to time-shared minicomputer 103. Also, application system's ROM/PROM memory would be replaced by a writable program store such as RAM for continual program changes. Thus, the disclosed microprocessor support system can be configured and operated in a number of ways depending on the needs of the engineer.

DETAILED DESCRIPTION—FIGS. 3-23

Drawing FIGS. 3 through 23 disclose the details of the microprocessor support system as shown in FIGS. 1 and 2, and illustrate how the various elements of our inventive embodiment cooperate to provide the microprocessor support system. For simplicity sake, the block diagram of field test unit 206 (FIGS. 1 and 2) have been labeled to show which of FIGS. 3-23 relate to each block of circuitry in field test unit 206. Thus, while the following description delves into the details of each block of field test unit circuitry and its associated figures, the reader will find it helpful to refer to FIGS. 1 and 2 to obtain an overview and to keep the various elements of the disclosed microprocessor support system in perspective.

FIELD TEST UNIT 206

For the sake of clarity, the details of field test unit 206 will now be explored. Field test unit 206 is interposed between time-shared minicomputer 103 and application system 210 and serves to control the operation and testing of application system 210 while also collecting test data and ordering this data for transmission to time-shared minicomputer 103 via the data link. Field test unit 206 is comprised of a Receiver circuit 201, Arbiter circuit 202, FTU microprocessor 209, memory 207, 221, 215, Matcher and Elapsed Time Clock circuit 208, Transfer Trace and PROM Programmer circuit 203, Interface circuit 216, Sanity and Receiver circuit 213. At this point it is important to clarify the terminology employed herein with respect to FTU microprocessor 209. By FTU microprocessor 209, we mean all the circuitry shown on FIGS. 8 and 9. That is, Central Processing Unit 801 and all its associated clock, temporary memory, buffer, driver, decoding and interrupt circuitry. Thus, FTU microprocessor 209 constitutes a complete small computer and references to FTU microprocessor 209 will typically indicate a standard "computer" operation as opposed to some minutiae of circuit operation. These references, of course, will be to well-known standard computer functions, the detailed description of which is beyond the scope of this application.

To illustrate the operation of field test unit 206, it is best to postulate a typical situation and then follow the activity in the microprocessor support system. To wit, let us assume that an engineer located at time-shared minicomputer 103 has generated (in well-known fashion) a set of control instructions for field test unit 206 to follow. Let us further assume that these control instructions request that field test unit 206 monitor certain address leads of application system 210 and upon the occurrence of the following bit pattern—"1101"—begin timing until that bit pattern again appears. Additional details will be supplied as we proceed through the description of field test unit 206, but for now assume that the machine language instructions are being transmitted to field test unit 206 by time-shared minicomputer 103 via data link 225 and data modems 205, 130. Data modem 105 at field test unit 206 receives the data (machine language instructions) and supplies this data to field test unit 206.

RECEIVER CIRCUIT 201—FIG. 3

Figure 3:
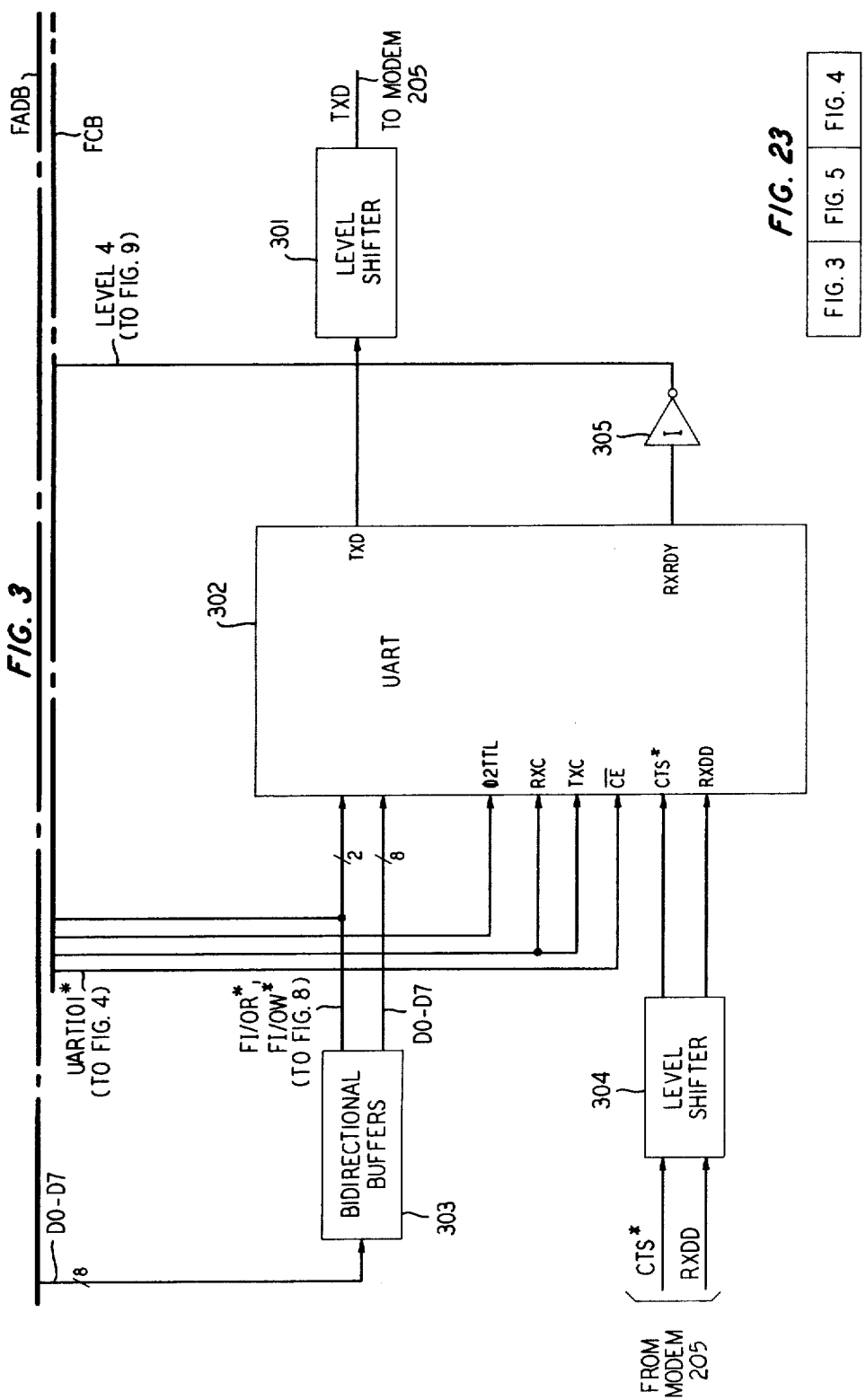

Data from data modem 205 is received in FTU 206 by Receiver circuit 201. A diagram of this circuit is shown in FIG. 3. EIA level signals originated by time-shared minicomputer 103 are received from data modem 205 on lead RXDD and level shifter 304 converts these signals to the TTL levels used in FTU 206. The TTL level serial data stream from level shifter 304 serves as input to an Intel type 8251 Universal Asynchronous Receiver/Transmitter (UART) 302 which converts the serial data stream into 8-bit words which are placed on FTU data bus (FADB) leads DO—D7 upon UART 302 receiving enable signals from data modem 205 on lead CTS*. Since UART 302 operates bidirectionally, 8-bit words of outgoing data are also taken from leads DO—D7 and are converted into a serial data stream and transmitted to data modem 205 on lead TXD via level shifter 301. In the case of incoming data from data modem 205, when UART 302 has assembled an 8-bit parallel word, (a byte), it generates a high signal on output RXRDY* which thereby places low a signal via inverter 305 on lead LEVEL 4. This low signal on lead LEVEL 4 is carried by field test unit control bus FCB to field test unit microprocessor circuit 209 where it activates priority interrupt control 901 shown on FIG. 9. FTU microprocessor 209 and its associated FTU Program Store 207 constitute an 8-bit parallel stored program controller which handles all internal FTU data movement and the interpretation of FTU user directives. Therefore, upon receiving an interrupt from UART 302 via priority interrupt control 901 on lead INT, CPU 801 of FTU microprocessor circuit 209 will place a low enable signal on lead UARTI01, thereby causing UART 302 to place the received data on the FTU data bus leads D0–D7. Since UART 302 has insufficient power to drive FTU data bus FADB directly, bidirectional buffers 303 are interposed between UART 302 and FTU data bus FADB to provide the requisite drive current. The directionality of the buffer operation is also controlled by control data circuit 805 of FTU microprocessor circuit 209 via leads FI/OR* and FI/OW* of FTU control bus FCB which indicate read/write the data bus, respectively. When each 8-bit word of data is placed on FTU data bus leads D0–D7, CPU 801 will read the incoming data and place it in temporary storage which comprises RAM0-7 (910–917) of FTU microprocessor 209 shown on FIG. 9 until 256 bytes have been received. FTU microprocessor circuit 209 then performs a standard checksum operation on the data block to assure its accuracy and moves the block of data to one of three destinations depending on previously input user directives. These three destinations are: (1) FTU Program Store 207 consisting of RAM memory 701 shown on FIG. 7; (2) Application system's RAM memory (not shown) residing in application system 210; (3) Common Memory 221—a 3K block of RAM memory residing in FTU 206, but accessable to both FTU microprocessor 209 and application system microprocessor 212.

DATA STORAGE—FTU PROGRAM STORE 207

Since it is assumed that the user had issued a directive to FTU 206 indicating that incoming serial data was a program to be executed by FTU 206, FTU microprocessor 209 will then place the received blocks of data in RAM memory 910–917 of FTU microprocessor 209. This is accomplished by FTU microprocessor 209 generating program address information and placing this information on leads AD0-15. This, coupled with memory write enable signals appearing on leads FMEMW* and WROT*, will cause the data appearing on leads D0-7 to be stored in the appropriate locations in RAM 701. When the data transmission from time-shared minicomputer 103 is completed, the user would direct FTU microprocessor 209 to begin executing the program it had received.

SANITY AND RECEIVER CIRCUIT 213, INTERFACE CIRCUIT 216—FIG. 6

As previously mentioned, the program that was just stored in FTU Program Store 207 contains instructions for FTU 206 to monitor certain address leads of application system 210. Interface circuit 216 and Sanity and Receiver Circuit 213 function to provide that capability.

Sanity Control and Receiver Circuit 213 and Interface circuit 216 allow FTU 206 to access the application system memory by extending the application machine 210 internal buses to the FTU Address, Data and Control buses FADB, FCB. Interface circuit 216 plugs into a slot in application system 210 backplane, thereby connecting application system 210 to FTU 206 via two fifty-wire flat cables.

When FTU 206 is not actively reading or writing the application system memory both Interface circuit 216 and Sanity and Receiver circuit 213 buffer the application system Address, Data (TADB) and Control (TCB) buses to the backplane of FTU 206 thereby allowing the FTU's debugging tools such as the Matchers and Elapsed Time Clock 208 and Transfer Trace 203 to monitor them. As shown on FIG. 6, Interface circuit 216 is comprised of a number of buffers 601–608 to buffer the internal data bus of application system 210 with the extended application system bus TADB while buffers 609–624 interface the internal address bus of application system 210 with extended application system bus TADB and FTU bus FADB while buffers 625–634 interface the control bus of application system 210 with FTU internal bus FCB and extended application system control bus TCB. Latch 680 is connected to FTU data bus FADB and provides several single bit control functions on Sanity and Receiver Circuit 213. Bit 1 of latch 680 serves as one of two inputs to gate 641 which controls the high priority interrupt input (IHIGH) of application microprocessor 212. The I1* input of gate 641 is controlled by Matcher 208 as described hereinbelow.

The Sanity Control portion of Sanity Control and Receiver circuit 213 is closely tied to application system microprocessor 212. Microprocessor 212 has associated control circuitry 211 to make sure it is constantly running and executing proper sequence of code (i.e., the microprocessor is "sane"). In controlling application system microprocessor 212 it is sometimes necessary to stop application system microprocessor 212 from executing by causing it to execute a HALT instruction or place it in the HOLD mold. In these instances the Sanity control logic provides the means of doing an orderly shut down of the microprocessor logic and an orderly start up when program execution begins again. When the HALT or HOLDACK control lines (FIG. 6) from application system 210 switch high, gates 660-662, 642, 652 provide signals necessary to disable application system sanity circuitry (not shown) via Sanity Circuit input SANC*. When application system microprocessor 212 exits the HALT or HOLD mode, the Sanity Circuit will be reenabled. FTU microprocessor 209 can selectively disable the application system Sanity Circuit via bit 8 of latch 680 of Sanity Control and Receiver Circuit 213.

Thus, when FTU microprocessor 209 reads the data (instructions) stored in FTU Program Store 207, and determines that the address leads of application machine 210 are to be monitored, the above-described circuitry will provide the required interface with the application system. The monitoring function will be provided by the FTU Matcher circuit 208 which is a programmable monitoring circuit described hereinbelow.

MATCHER CIRCUIT 208 (FIGS. 10–12)

Matcher circuit 208 contains four data and/or address matchers. Each of these matchers are "bit programmable" in that "don't care" conditions can be specified in the data and address fields when the user is setting up the match to monitor application system 210.

The user can also specify that the matchers cause a Halt, Status, Wait or Pass action whenever conditions for a match are met. The Halt and Status actions, when initiated, cause a high priority interrupt to be transmitted to application system 210 which responds by executing instructions stored in Common Memory 221 (as discussed hereinbelow). The utility executive program instructions stored in Common Memory 221 will cause application microprocessor 212 to store the contents of its registers in Common Memory 221 and then halt if the Halt action was requested, otherwise, return to normal processing if the Status action was requested. If the user selects the Wait action, the "ready" or slow memory lines of application microprocessor 212 is switched low whenever a match occurs, thereby causing application microprocessor 212 to enter a wait mode with the address, data and control lines remaining in a constant state. This enables the user to trace signals with a logic probe to isolate any fault in application system 210. When the user selects the Pass action, a strobe pulse is generated and application microprocessor 212 remains unaffected. The strobe pulse is made available to the user through a connector on the front panel of FTU 206, providing a means to trigger an external debugging tool (such as an oscilloscope) on a software event occurrence in application machine 210. Additionally, one matcher can be used to enable another matcher or any of the peripheral debugging aids in field test unit 206.

RAM 813—FIGS. 18–20

Figures 18, 19, 20:
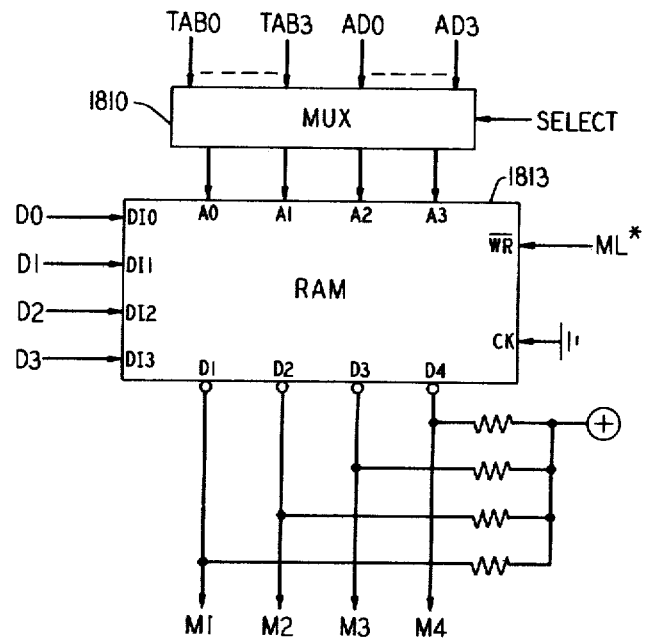

The basic module used in the programmable bit comparison section of the Matcher circuit is a 16 word by four bit RAM. To understand how the matchers operate, one must first understand how this RAM device can function as a four-bit programmable comparator. FIG. 18 illustrates the comparison circuitry used to monitor the first four bits of application system 210 address bus leads TAB0-TAB3 of bus TADB. The 16 word addresses of RAM 813 can be thought of as representing one of the 16 possible unique states of the four address lines (TAB0-TAB3). The four bits in each word of the RAM provide four independent programmable outputs for each of the 16 unique address line states. These bit outputs are used as the match indicators M1-M4.

FIG. 19 illustrates the contents of RAM 813 if we desired to program Matcher 1 to trigger when application system 210 switched address leads TAB0-TAB3 to the "1101" state. In FIG. 19 it can be seen that bit 1 (i.e., Matcher 1) of RAM 813 at address 1101 has been written by field test unit microprocessor 209 via leads AD0-AD3 to be a logic "0". The rest of the memory locations in RAM 813 are programmed with logic "1s". The field test unit microprocessor 209 then switches MUX 810 to allow application system 210 address lines (TAB0-TAB3) to control the address inputs (A0-A3) RAM 813. If these address lines are switched by application system 210 to the "1101" state, the M1 output of RAM 813 would go to the logic "1" state signifying a match. It should be noted that bits D2 to D4 of RAM 813 can be programmed in a similar fashion, thus providing a total of four matched outputs (M1 to M4) using RAM 813.

Bit programmability as opposed to the above-described address programmability of the matchers is illustrated in FIG. 2. This diagram shows the contents of RAM 1813 if it is desired to have Matcher 1 match on the condition that lead TAB2 is a logic 1, thereby specifying leads TAB0, TAB1, and TAB3 as "don't care" bits in RAM 813. Note that match 1 is programmed to fulfill these requirements by placing a logic "0" in every D1 location when the situation of the address is such that there is a logic "1" in TAB2. When MUX 810 is switched to place leads TAB0-TAB3 in control of inputs A0-A3 of RAM 813, Matcher 1 will be activated whenever application system 210 switches lead TAB2 to a logic 1 state.

Figure 10:
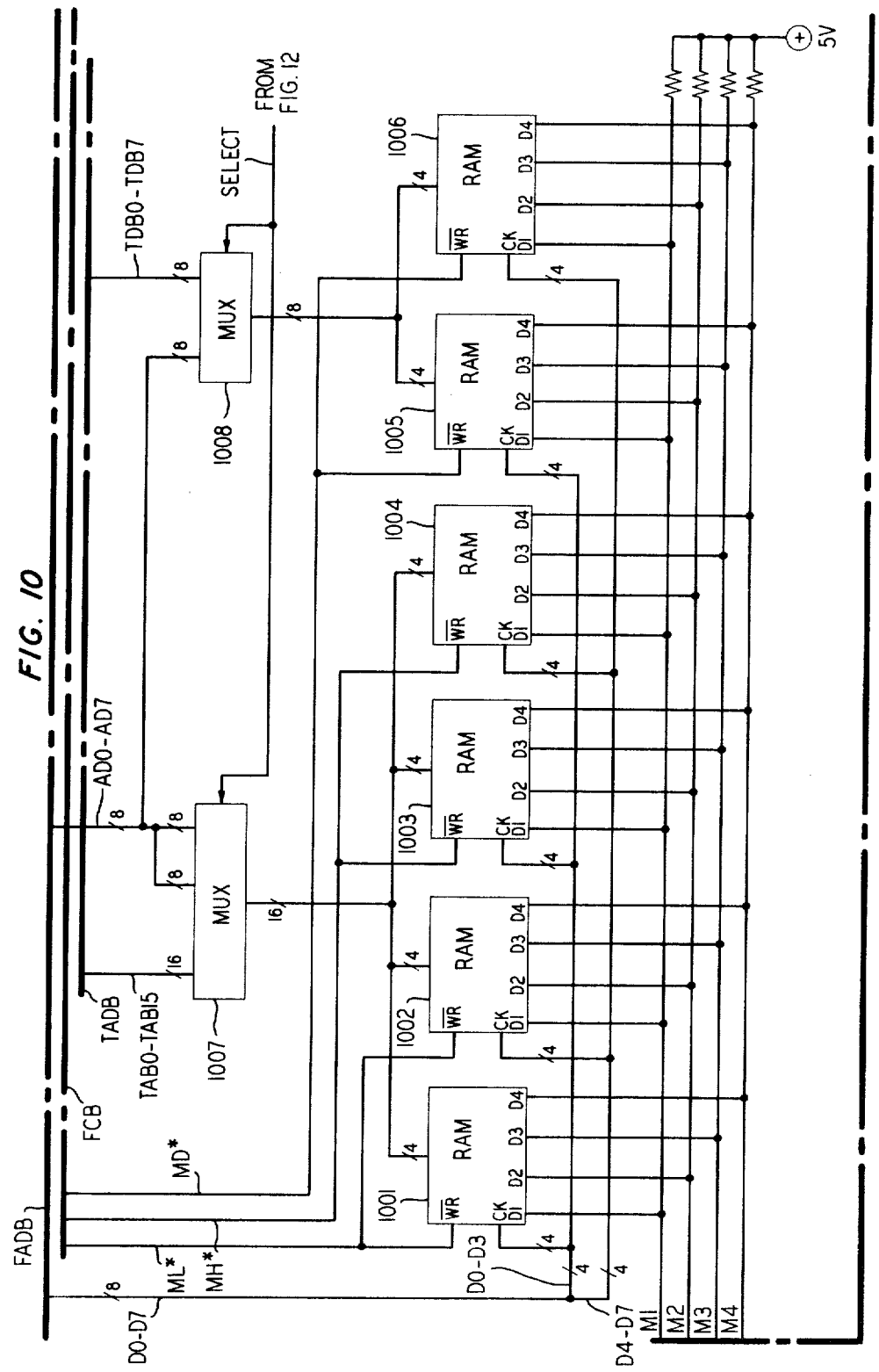
Figure 11:
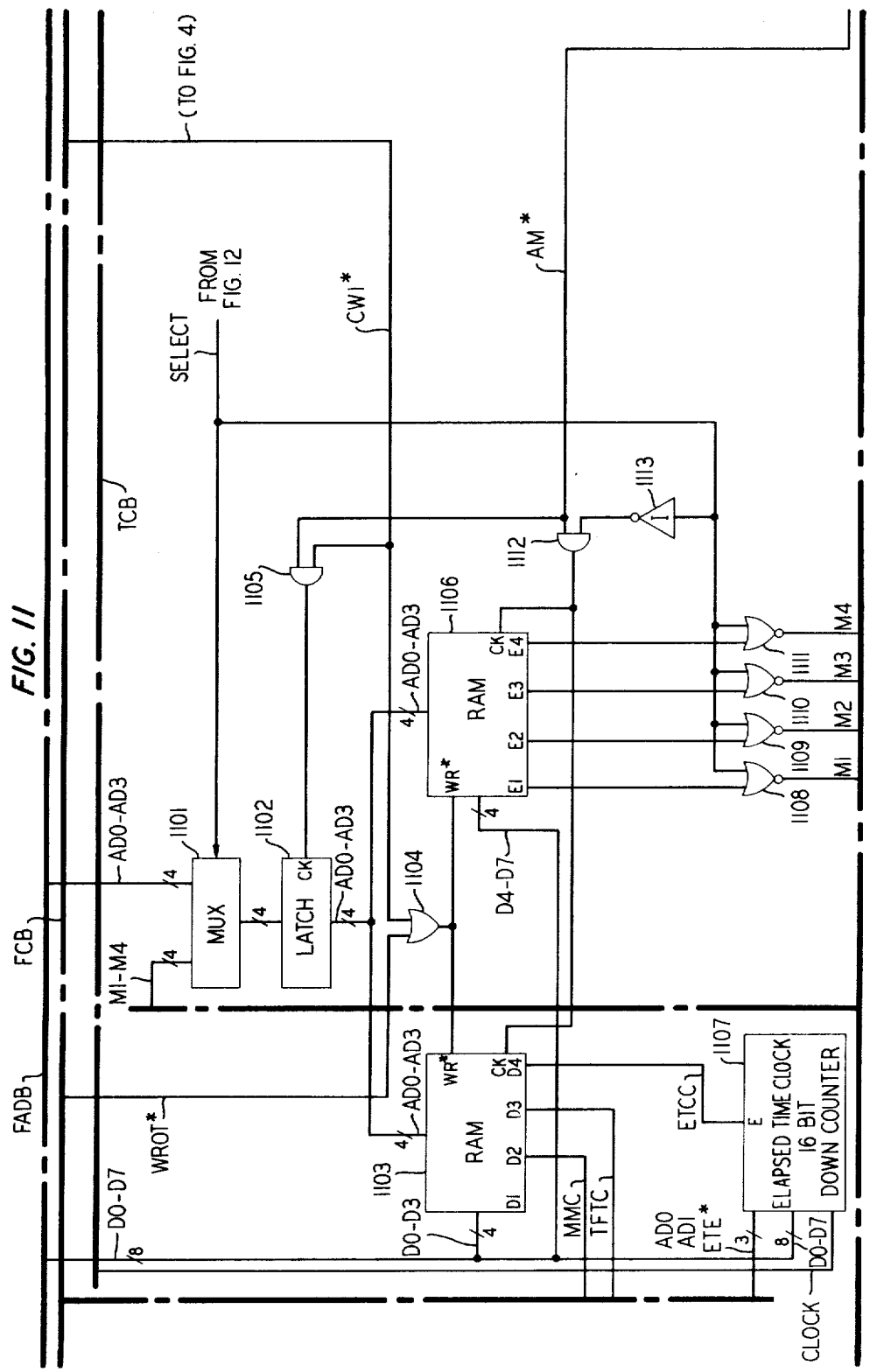

The RAMs used to provide the matching function in the disclosed circuit have open collector outputs, therefore by wiring together the D0-D3 outputs of RAMs 1001-1006 of FIG. 10, we can create four 24-bit matchers. Sixteen bits of each matcher are used to monitor the 16 application system 210 address lines TAB0-TAB15. The remaining eight lines are used to monitor application system 210 data lines TDB0-TDB7 as shown in FIG. 10. When placed under control of field test unit microprocessor 209 for initialization, RAMs 1001-1006 are handled as three 256-byte blocks of memory. Address decoding logic 493 on FIG. 4 performs the block address decoding and gates the block address with field test unit microprocessor 209 memory write pulse on lead FMEMW* to form the ML*, MH*, and MD* (FIGS. 4 and 10) matcher write signals. These signals strobe match initialization information from the field test unit data bus (leads D0-D3 of bus FADB) into RAMs 1001-1006.

MATCHER ACTION SELECT AND STROBE CIRCUITS

As previously mentioned, the user may specify that one of several actions (Halt, Status, Wait and Pass) occur when a matcher is triggered. The user must also specify if the match is to take place when application system 210 is doing a memory read as memory write or a I/O read or I/O write. In addition the user may also specify that any or all of the matchers be disabled until a TTL signal using edge input is applied to the matcher's external input connector on the front panel of FTU 206. Another option available to the user is the match on $N^{th}$ pass although this option is associated with Matcher 1 only. This option allows the user specified action to occur on the $N^{th}$ time Matcher 1 is triggered. All of the control for implementing the above specified options is provided by the matcher action select and strobe circuitry shown in FIG. 11.

Figure 12:
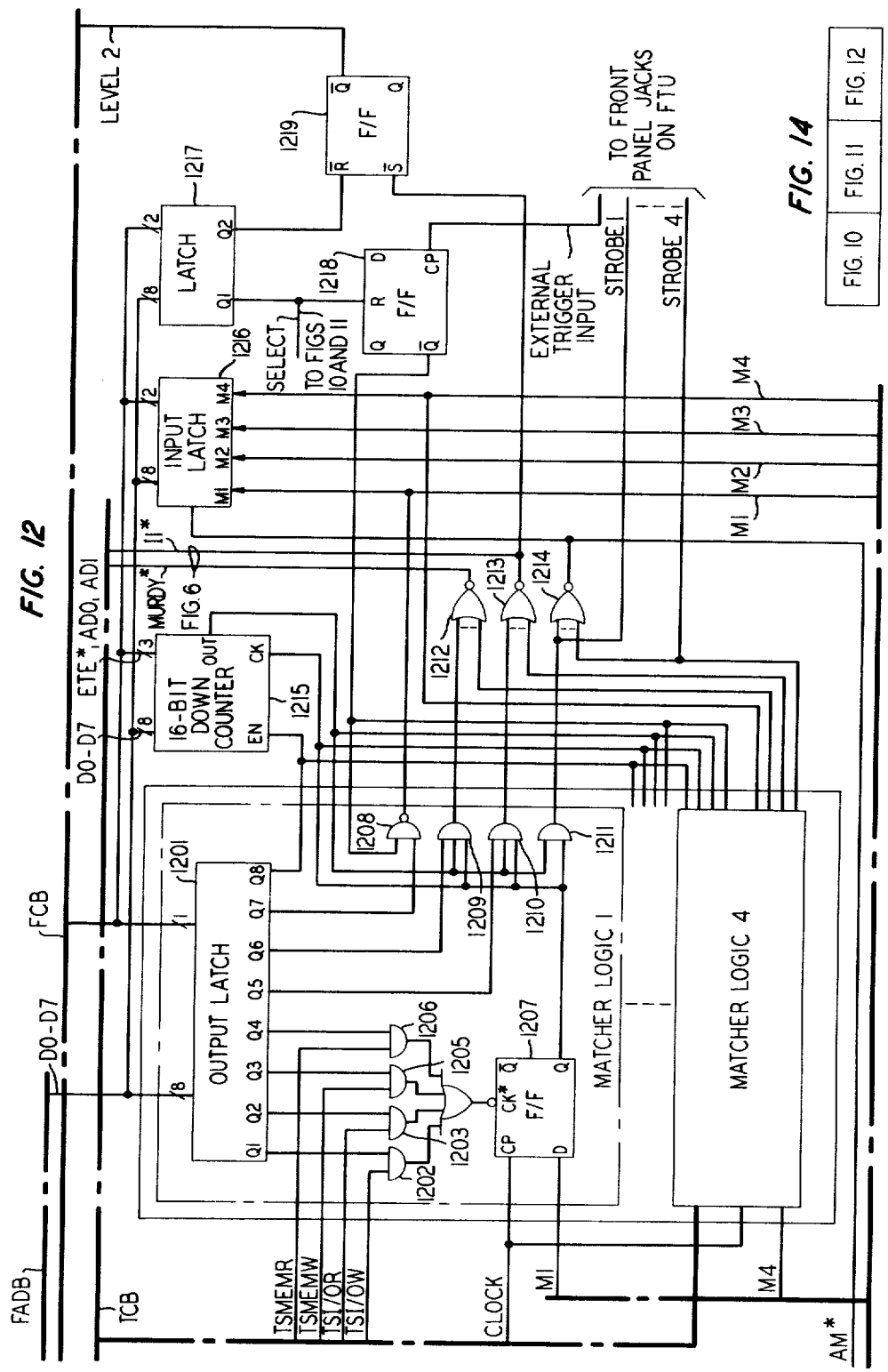

The eight bit output latch 1201 on FIG. 12 is written by FTU microprocessor 209 with the action and strobe selection information specified by the user. If the user selected a match on I/O write the Q1 output of latch 1201 would be high, thus whenever an I/O write signal was present on the application system control lead TSI-/OW*, the output of the AND-OR select gates would go high. If during this write operation the address and data match conditions programmed into the Matcher RAMs the state of application system address and data buses. The M1 matcher output signal would be high causing the matcher flip-flop 1207 to be clocked. The output of this flip-flop indicates that a valid match has occurred. For the time being, let us assume that the user has not specified N passes to occur before an action and that the output of 16-bit counter 1215 is high. If the user has specified a match and wait action, the match event will cause the output of gate 1209 to go high resulting in the output of gate 1202 going low and placing a low signal on lead TSRDY* thus placing application system 210 in a wait state. If the user had selected the match and halt or status action, gates 1210 and 1213 would have switched causing output I1* to go low. This will result in a high priority interrupt (IHIGH) being issued to application microprocessor 212 via Sanity and Receiver Circuit 213. Application microprocessor 212 will then begin to execute the utility system executive program stored in Common Memory 221 as previously described. The I1* signal will also cause flip-flop 1221 to reset, resulting in a LEVEL 2 interrupt being issued to FTU CPU 801 which will service this interrupt by examining Common Memory 221 and displaying status information stored therein by application microprocessor 212 to the user via keyboard terminal 204. The matcher pass strobe (output of gate 1211) will switch on a match regardless of the action specified by the user. In addition to the user specified control signals, the match strobe circuit provides match signal (AN*) which switches when any of the four matchers trigger. This signal is used by the matcher enable, peripheral control circuit and input Latch 1216. Input Latch 1216 can be read by FTU microprocessor 209 to determine which matchers have triggered.

MATCHER ENABLE AND PERIPHERAL CONTROL CIRCUITS—FIGS. 17-21

This section of Matcher 208 allows the user to enable/disable any matcher and/or debugging aid such as Transfer Trace 203 or Mimic Memory 215 when a match is triggered.

Programmable control of the matcher enable and peripheral control lines is provided using a 16-word by 4-bit RAM similar to the RAM used in the match comparison circuitry. The Intel 9410 type control circuit RAMs differ slightly in that they have a clocked output buffer register. After the address inputs to the device have stabilized, the output register must be clocked before new data will appear on the output of the RAMs. This feature allows changing of address and data on the input of the device, without changing the state of the output data lines. FIGS. 17 and 21 illustrate use of the 9410-type RAMs in the matcher enable and peripheral control circuits. Matcher enable RAM 1103 can selectively enable any or all of the matchers, while peripheral control RAM 1106 controls the enable signal to Mimic Memory 215, Transfer Trace 1300 and Elapsed Time Clock 1107 peripherals.

Figure 4:
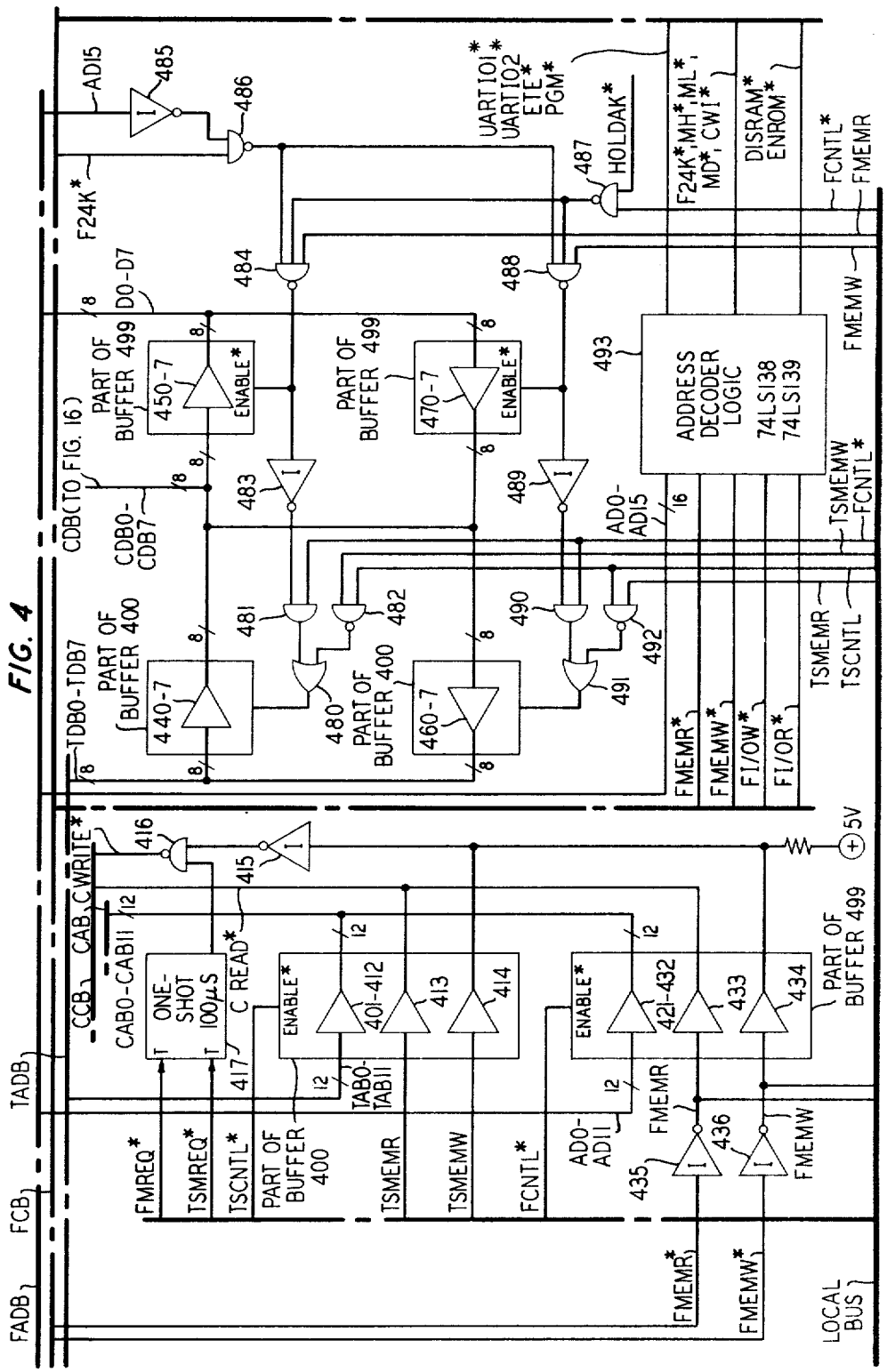

As in the case of the match RAMs, FTU microprocessor 209 treats the two control RAMs as a 256 byte block of memory whose address select lead CW1* is decoded by address decoding logic 493 (FIG. 4). To initialize the control circuit RAMs, MUX 1101 is switched to place FTU address lines (AD0-AD3) of FTU address and data bus FADB on the inputs of latch 1102. The control RAM select signal from the I/O-Arbiter board appears on lead CW1* and clocks FTU address leads AD0-AD3 into latch 1102 which controls the address inputs of the RAMs. The FTU write strobe signal appears on lead WROT* and will then cause information on the FTU data bus leads D0-D7 to be written into the control RAMs. The last address written by FTU microprocessor 209 is address zero (AD-0-AD3="0000"). When the SELECT input of MUX 1101 input is switched to monitor application system 210, the data in address zero of the control RAMs will be loaded into the RAM's output register and govern the initial enable conditions of the matchers and peripheral control signals via leads MMC, TFTC, ETCC.

Subsequent enabling of the matcher and peripheral control lines is dependent on user specified action to occur when a matcher is triggered. These user specified actions are encoded in the data written into the control RAMs by FTU microprocessor 209. When a matcher is triggered, the match outputs (M1-M4) will be loaded into latch 1102 by the leading edge of the any match strobe appearing on lead AM* which enables gate 1105 and causes the state of M1-M4 to be clocked into Latch 1102. Therefore, new address is presented to the control RAMs 1103-1106. The resultant new enable word will not control the matcher and peripheral enable lines until it is clocked into the output latch of the RAMs by the trailing edge of the any match strobe signal appearing on lead AM* . The new control word will then govern matcher and peripheral enable controls until next matcher is triggered.

The matcher enable control provided by RAM 1103 allows the user to specify which matchers should be enabled after a specific match occurs. For example, FIG. 17 shows the data which would be programmed into RAM 1103 by FTU microprocessor 209 for the case where Matcher M1 is initially enabled and Matcher M2 is to be enabled if Matcher M1 triggers. The data in address zero of the enable RAM 1103 will determine the initial enable conditions of the matchers as previously described. At address zero of RAM 1106, the E1 output will be low, allowing the open collector output of gate 1108 to go high if the conditions from an M1 match are met. Also, the E2-E4 outputs of RAM 1106 will be high, disabling Matchers M2-M4 via gates 1109-1111. When Matcher M1 triggers, a 0001 will be loaded into Latch 1102 and on the trailing edge of the any match strobe (AM*) the enable word at address 0001 in RAM 1103 will control Matchers M1-M4 via gates 2208-1111.

In this example, output E1 of RAM 1106 would be low, enabling Matcher M2, while Matchers M1, M3, and M4 would be disabled. If the user had specified a match on Nth pass, the FTU microprocessor 209 would load 16-bit counter 1215 with a count of N-1, causing its output to go low inhibiting gates 1209-1211. In addition to loading Latch 1201 with the desired match qualifiers and actions, the FTU microprocessor 209 would set bit Q8 of Latch 1201, enabling 16-bit counter 1215. When the match address, data and required qualifier conditions are met, the match flip-flop 1207 will toggle, and counter 1215 will decrement its count by one. When match N-1 occurs, counter 1215 will be clocked to a count of zero, causing its output to go high and removing the inhibit to gates 1209-1211. On the Nth incidence of the match conditions, the selected action will occur.

When the external enable qualifier is selected, the matcher action select and required qualifiers are programmed as described above. However, when Latch 1201 is loaded by the FTU processor, bit Q7 is set to a logic "1" (FIG. 3). During the loading phase of operation, the select output of Latch 1217 is high forcing the Q output of flip-flop 1218 to be high. The output of gate 1208 will be low inhibiting the selected matcher (in this case M1). When the SELECT output of latch 1217 is switched high and the matchers begin to monitor the application matcher M1 will be inhibited until a TTL level rising edge clock pulse is received on the external trigger input. The rising edge clock pulse will cause flip-flop 1218 to clock and the output of gate 1208 to release the inhibit from M1. Matcher M1 operation will then proceed as previously described.

ELAPSED TIME CLOCK 1107—FIG. 11

The use of the peripheral control signals can be illustrated by describing their control of Elapsed Time Clock 1107. This feature of FTU 206 allows the user to measure the time it takes application system 210 to execute a program. The feature is invoked by setting one matcher to trigger and start Elapsed Time Clock 1107 at the beginning of the program segment and another matcher to trigger at the end of the segment of code and stop Elapsed Time Clock 1107. By specifying that a matcher will enable Elapsed Time Clock 1107, a user will cause a logic "1" to be stored in bit D4 of the matchers peripheral enable word. For example, FIG. 21 shows the contents of Matcher Control RAM 1103 where Matcher M1 has been programmed to start Elapsed Time Clock 1101. When this matcher triggers and its peripheral enable word is loaded into the output register of RAM 1103 (as previously described) it will switch the enable input of Elapsed Time Clock 1107 to a logic "1" state, allowing the counter to count. The matcher set to stop Elapsed Time Clock 1107 will have a logic "0" stored in bit D3 of its control word. When this second matcher triggers the D3 output of RAM 1103 will go to a logic "0" and stop the Elapsed Time Clock 1107. FTU microprocessor 209 can then read the contents of the Elapsed Time Clock 1107 and display this information to the user.

The remaining two peripheral control signals from RAM 1103, MMC and TFTC, are used to control Mimic Memory 215 and Transfer Trace 203 debugging aids, respectively. The purpose and control of Mimic Memory 215 were described earlier in the text. The Transfer Trace debugging aid supplies the user with a history of program branch addresses. Its operation is described below.

TRANSFER TRACE

The Transfer Trace 203 records a "from", "to" history of the last 128 program branches executed by the application microprocessor. The trace can be turned ON and OFF by matcher 208 via the TFTL control line. Matcher 208 control of the Transfer Trace parallels that of the ETC, previously described. The combination of Matcher 208 control and dual port access to the trace memories allows the Transfer trace 203 to be used without disrupting the service provided application machine 210.

The Transfer Trace Circuit 203 consists of two 256-word by 8-bit trace memories (1315 and 1316, FIG. 13), a memory address counter 1318, comparator 1310 and various control logic comprised of gates 1311-1314, 1317, 1320-1321.

Transfer Trace 203 is enabled when the Transfer Trace control line TFTC is switched to a logic "1" state by Matcher 208. During subsequent application machine instruction fetch cycles, the instruction address or the TADB will be compared to the address in transfer instruction counter 1318. If the two compare, the application microprocessor 212 has not executed a branch instruction. Transfer instruction counter 1318 will then be written into Trace Memory 1315 and 1316 to maintain an up-to-date "from address" in the memory. Following this transfer, instruction counter 1318 is incremented to the address of the next sequential instruction in application machine 210 and the comparison process is repeated during subsequent application machine 210 instruction fetch cycles.

If the address on the TADB and the transfer instruction counter 1318 do not compare during an instruction fetch cycle, the application microprocessor 209 has executed a branch instruction. When this event occurs, memory address counter 1314 is incremented to save the "from address" in the trace memory and the address on the TADB is jammed into the transfer instruction counter 1318. The contents of the transfer instruction counter are then written into the trace memories 1315 and 1316. The trace memories 1315 and 1316 will now contain the address the application microprocessor 212 branched "from" and the address is branched "to" stored in consecutive trace memory locations. Next, memory address counter 1314 is incremented to the address of the next sequential instruction and the comparison process is completed.

Transfer trace 203 will continue to write both "from addresses" and "to addresses" into the trace memories 1315 and 1316 in a wrap-around mode, until Transfer Trace 203 is disabled by Matcher 208. When Transfer Trace 203 is disabled, FTU processor 209 can read trace memories 1315 and 1316 via MUX 1321 on flip-flop 1317. FTU microprocessor 209 will format the "from", to "addresses and display them to the user via local keyboard terminal 204.

DATA STORAGE—COMMON MEMORY 221—FIG. 16

While we have just described how field test unit 206 could monitor the activity of application machine 210, a far more powerful tool is the use of field test unit 206 to cause application microprocessor 212 to execute program instructions stored in Common Memory 221. This is accomplished by employing time-shared microcomputer 103 in well-known fashion to generate program instructions for application microprocessor 212. This data is transmitted from time-shared minicomputer 103 to field test unit 206 as described above. However, this data would be stored in Common Memory 221.

Common Memory 221 (FIG. 16) contains a 3 K byte block of RAM 100 which resides in FTU 206, but is accessable to both FTU 206 and application system microprocessor 212. The physical memory resides in FTU 206, however access to the memory is controlled by an asynchronous Arbiter circuit 500. Arbiter circuit 500 is a specific application of the general purpose "Asynchronous Arbiter Module" presented by R. C. Pearce, J. A. Field, W. D. Little on p. 931-2 of the September 1975 issue of the IEEE Transactions on Computers.

Common Memory 221 occupies the 60 to 63 K address space of application system microprocessor 212. This memory space is not normally used by the application program of application system 210 and is equipped only when FTU 206 is connected to application system 210.

MEMORY MAP—FIG. 15

Figure 15:
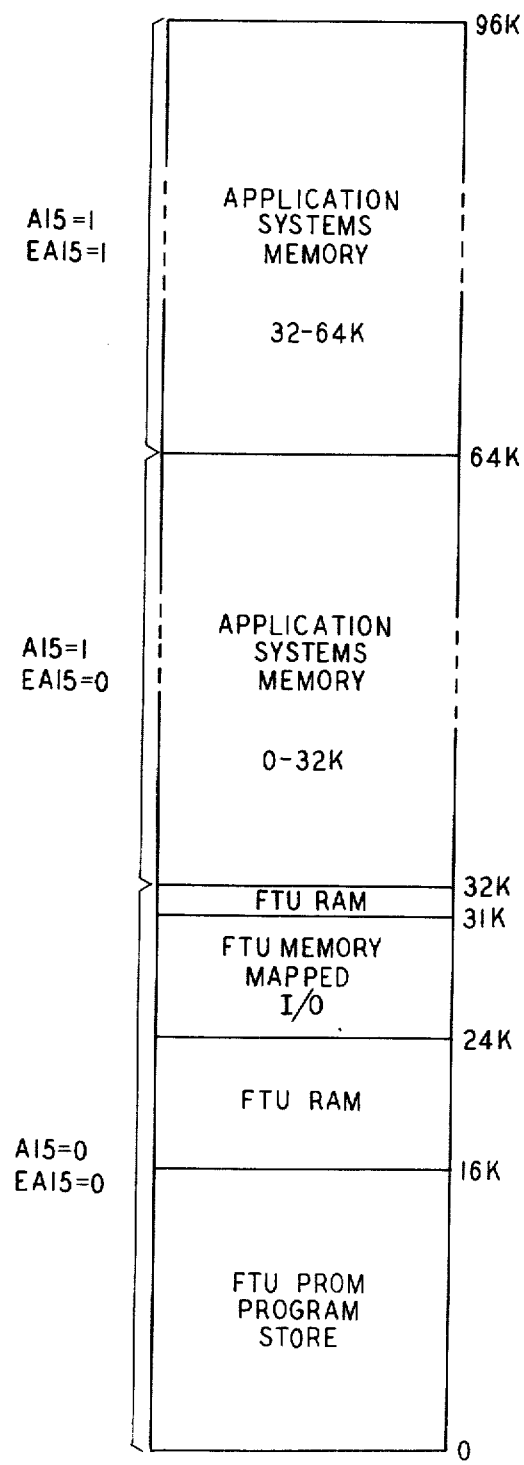
Figure 16:
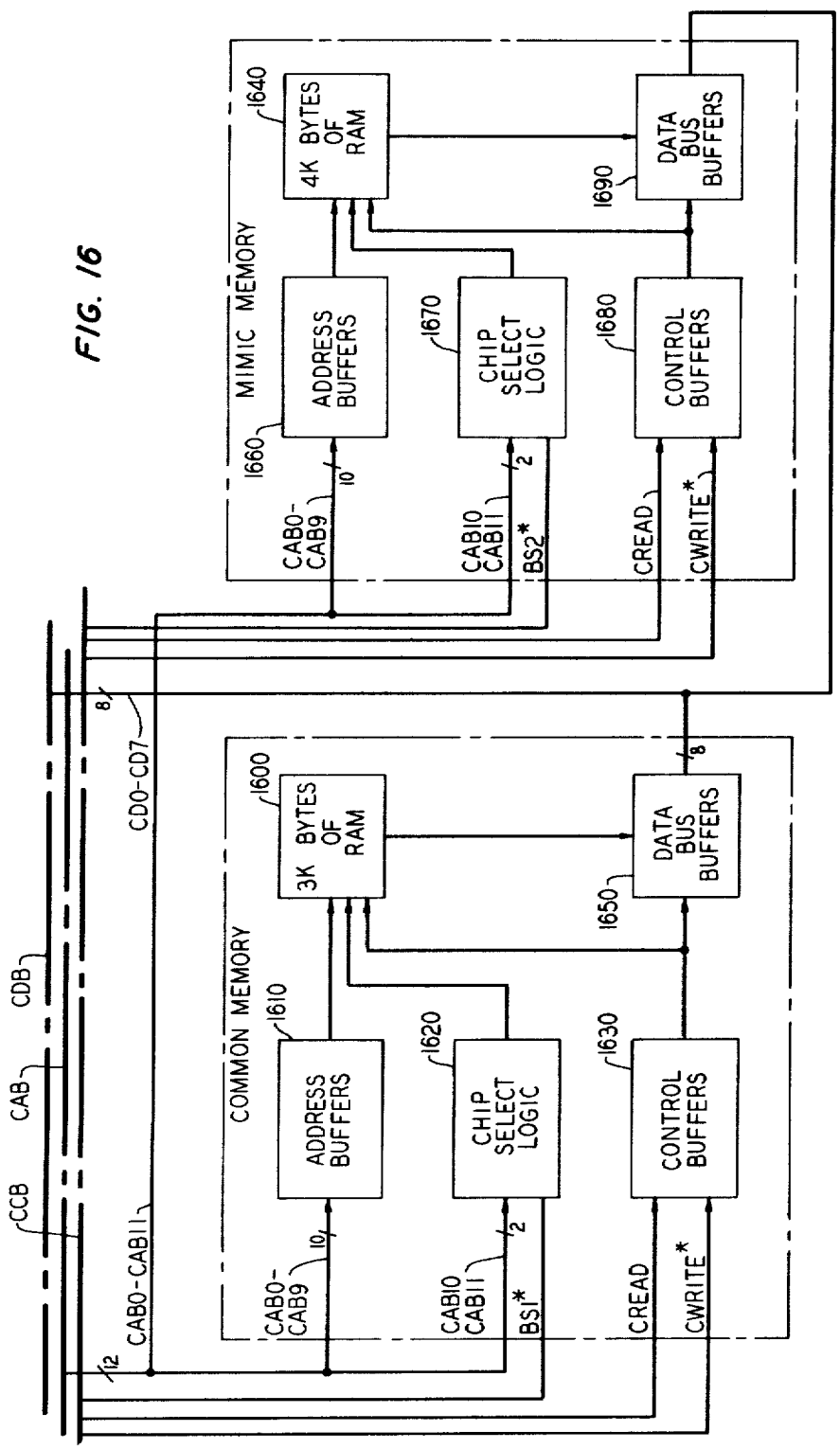

Both application system microprocessor 212 and FTU microprocessor 209 have a maximum direct addressing capability of 64 K bytes of memory. Since FTU 206 is required to read and write all of the application system memory as well as its own, it was necessary to develop an extended memory addressing scheme for FTU 206. This scheme uses an extended address bit (EA15) and the high address bit (AD15) of FTU 206 to divide the FTU memory space into three 32 K byte blocks which provides a total addressing capacity of 96 K bytes as shown in FIG. 15. The 0-32 K (AD15-0, EA15=0) address space of FTU microprocessor 209 contains all of the FTU program store, Random Access Memory and memory mapped I/O addresses. When FTU microprocessor 209 address above 32 K (AD15=1) the memory accessed will be that of the application system. Addresses in the 32 K;14 64 K (AD15=1, EA15=0) block of FTU memory are mapped into the 0-32 K address space of application system 210. Addresses in the 64 K-96 K (AD15=1, EA15=1) block of FTU memory are mapped into the application system 32-65 K address space. To access the application system memory, FTU 206 issues a hold request by setting bit 3 of Latch 680. A hold knowledge signal (HOLDACK) from application system 210 will then indicate that the system has tri-stated its buses and FTU 206 may take control of them. HOLDACK will cause the output of gate 263 to go low resulting in buffers 609–624 being enabled in the direction allowing FTU Address Bus leads AD0–AD14 and EA15 to control the application system address bus. During the reading or writing of application system memory, the extended application system data bus TDB0-7 is connected to FTU data bus FADB as will be explained later in the text. Gates 671–672 will enable the FTU read and write strobes (FMEMR* , FMEMW* ) to control the application system read and write strobe leads whenever FTU micprocessor 209 reads or writes memory above its 32K address space (AD15=1). Since in this particular situation, application system 210 has memory mapped I/O, FTU 206 is capable of reading and writing I/O ports in the same manner in which it writes application system Memory.

The direct memory access approach used in reading and writing the application system memory enables FTU 206 to read and write data while application system 210 is running. This memory accessing can be done without disrupting the service provided by application system 210.

In addition to data being transmitted from time-shared minicomputer 103 to application system 210, FTU 206 can copy data from application system 210 and send it to the time-shared minicomputer 103. This enbles complete verification of a users ROM program store at site of the installation.

Returning to the present situation, after FTU microprocessor 209 loads a program transmitted from time-shared minicomputer 103 into Common Memory 221 it causes application system microprocessor 212 to execute the program by exerting the high priority interrupt (IHIGH) via bit 1 of latch 680 (FIG. 6) on Sanity and Receiver Circuit 213. Bit 1 of latch 680 activates gate 641 thereby placing an interrupt signal on the high priority interrupt lead IHIGH of application system 210. This interrupt signal will cause application system microprocessor 212 to cease its routine processing. The IHIGH interrupt servicing routine of application system microprocessor 212 will cause it to begin executing at some preassigned memory location, such as 60K, which memory location is in Common Memory 221. Thus, the interrupt causes application system microprocessor 212 to jump to a new segment of program as supplied to Common Memory 221 by time-shared minicomputer 103.

While application system 210 is executing a program it can communicate with FTU 206 by setting Flags in Common Memory 221. As previously mentioned, both microprocessors 209, 212 are capable of reading and writing Common Memory 221 as synchronous Arbiter 500 allocates control on Common Memory 221 on a first-come/first-served basis. If one microprocessor is in control of Common Memory 221 and the second microprocessor attempts to access it, Arbiter 500 will cause the second microprocessor to enter a wait state (see Intel 8080 System User's Manual) until the first microprocessor is finished its access of Common Memory 221. Common Memory 221 is allocated by Arbiter 500 to a microprocessor only for the current read or write cycle of the microprocessor. Therefore, the second microprocessor will wait only a short period of time to gain control of Common Memory 221.

MIMIC MEMORY 215—FIG. 16

Asynchronous Arbiter 202 provides a similar type of multiprocessor access to a 4 K byte block of RAM used as a Mimic Memory 215. While Common Memory 221 always resides in the 60—63 K address space of application system 210, the specified address of Mimic Memory 215 can be changed by user request. The only requirement being that the specified address be on a 4 K boundry of application system 210 address space. Mimic Memory 215 can be read or written (initialize or monitored) by FTU microprocessor 209; however, it functions as a write only memory in reference to application system microprocessor 212. Once initialized to a 4 K boundry and enabled, any data written to a mimicked 4 K block of application system memory will also be written into Mimic Memory 215. Subsequent disabling of Mimic Memory 215 at some point in the application system program enables the user to capture the state of a 4 K block of the application system memory. The user may examine the contents of this 4 K block on local terminal 204 or transmit its contents to time-shared minicomputer 103 for further analysis.

ARBITER AND ADDRESS DECODING CIRCUIT 202 (FIGS. 4–5)

Figure 5:
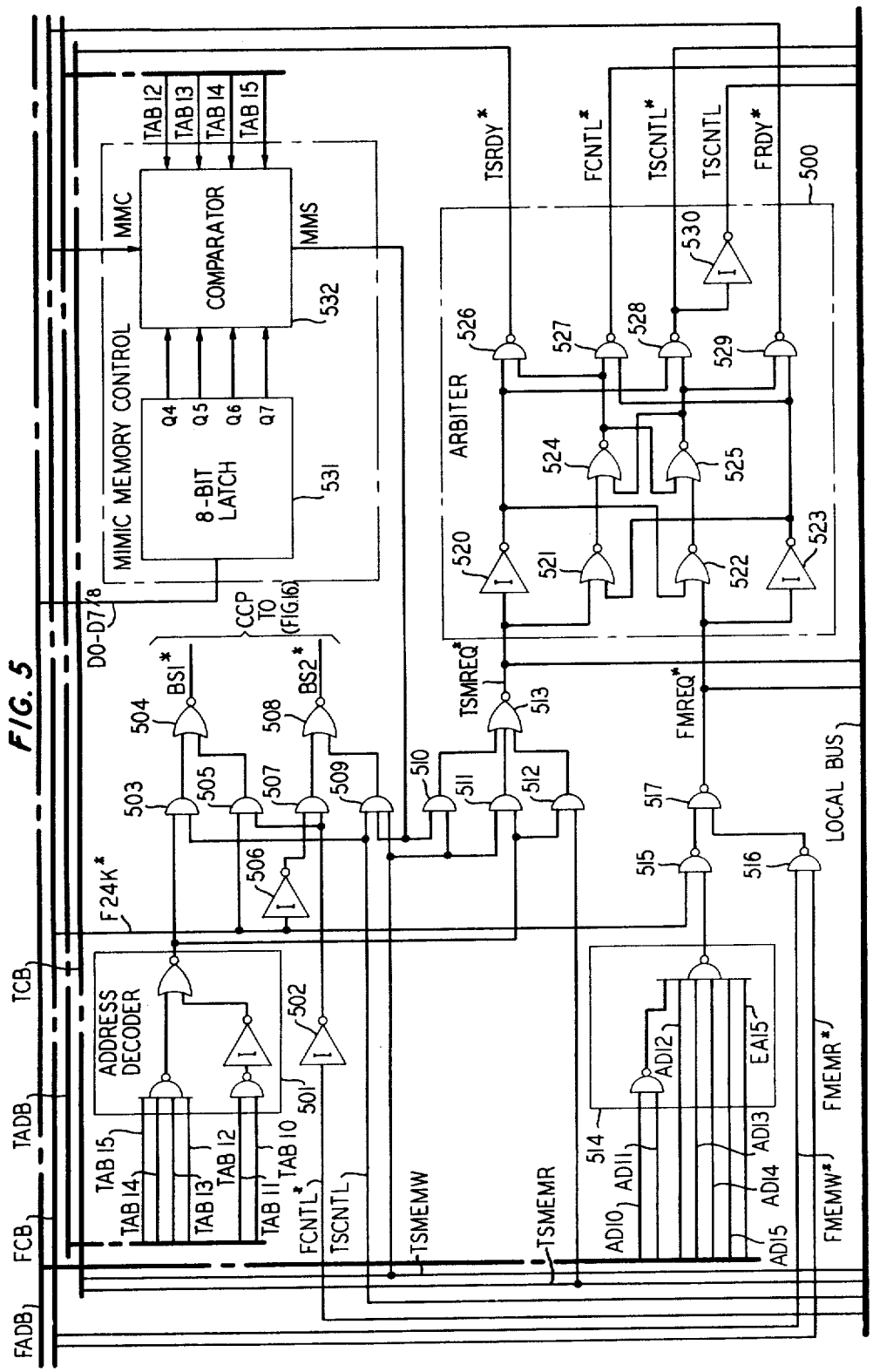
Figure 6:
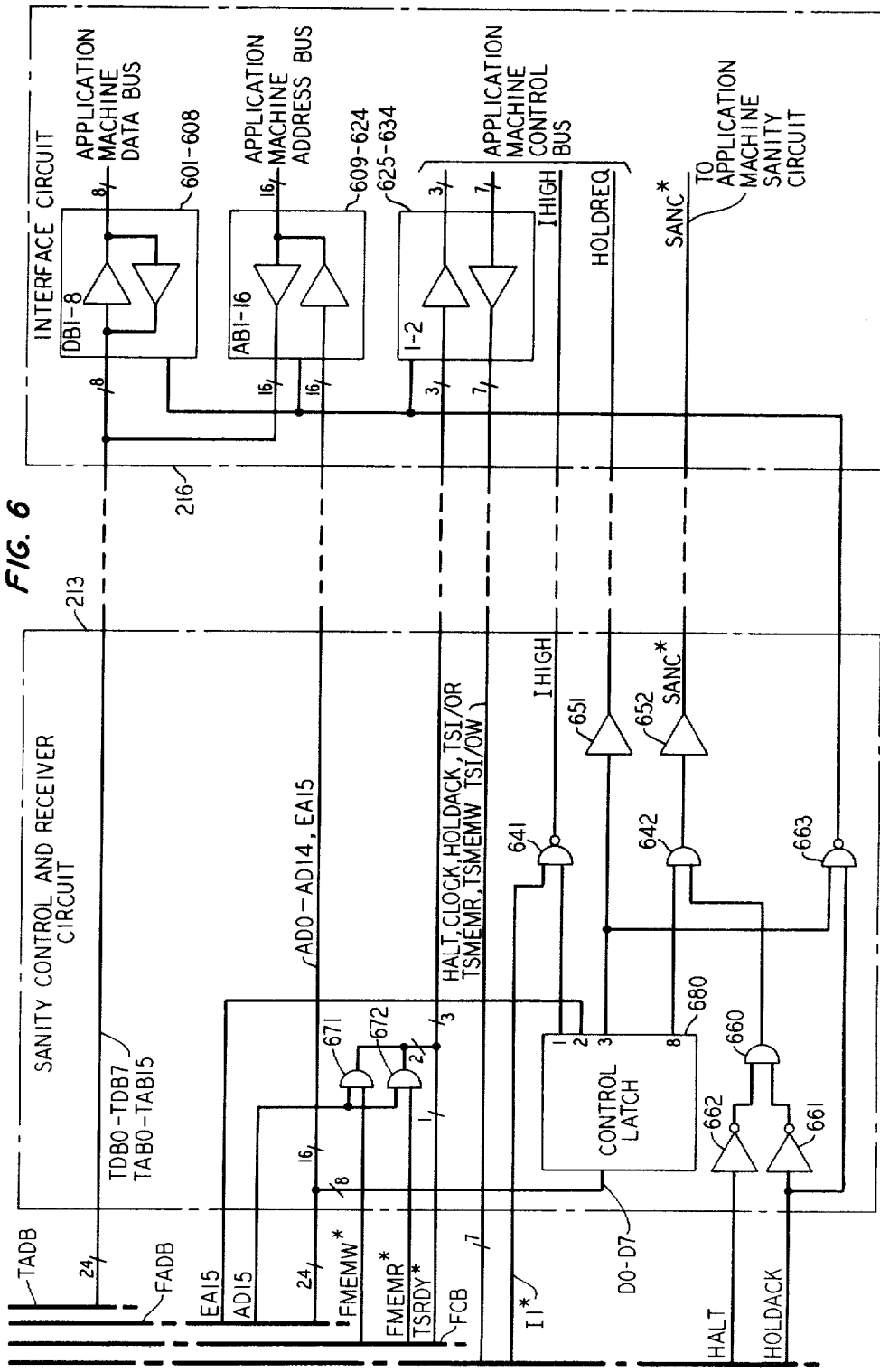

FIGS. 4—5 shows the Arbiter and address decoding circuit 202 used to control Common Memory 221 and Mimic Memory 215 of FTU 206. If application system microprocessor 212 attempts to read or write Common Memory 221 (60–63K), it will activate the appropriate ones of address leads of TAB0—TAB15 and these activated leads will be recognized by address decoder 501 on FIG. 5. Address decoder 501 generates a high output signal indicating that application system 210 is attempting to access Common Memory 221 and this signal in combination with a memory read/write signal on lead TSMEMR/TSMEMW activates gate 512/511 which in turn activates gate 513 causing the application system memory request lead (TSMREQ*) to go low, thereby requesting control of Common Memory 221. This request is received by asynchronous Arbiter circuit 500 which determines whether application system 210 or FTU 206 will be enabled to access Common Memory 221. The actual embodiment of Arbiter 500 comprises gates 520–530 and differs from the Pierce et al Arbiter referred to above essentially only in the selection of logic gates employed. Assuming that FTU 206 is neither requesting nor in control of Common Memory 221, the TSMREQ* signal will force the output of gate 521 to go high, resulting in the output of gate 525 going high thereby causing the application system control (TSCNTL*) output of gate 528 to go low. The presence of the TSCNTL* signal indicates that application system 210 currently has been given control of Common Memory 221. Also, the high signal on lead TSCNTL, coupled with the previously discussed high output signal from address decoder 501, activates gate 503 which turns on gate 504, causing the board select lead BS1* to go low thereby enabling the 3K Common Memory 221. If at this time FTU 206 were to attempt to access Common Memory 221, it would place the address of the Common Memory 221 on address leads AD0–AD15, F24K, and EA15, thereby enabling address decoder 514 which detects the memory access request on the address leads. The output of address decoder 514 coupled with an FTU memory read/write request on lead FMEMR*/FMEMW*. However, application system 210 has control of Common Memory 221 and Arbiter 500 blocks FTU 206 from accessing Common Memory 221 by disabling gate 525 thereby preventing FTU 206 from receiving a control enable signal on lead FCNTL*. Instead, the low signal on lead FMREQ* results in the FTU Ready (FRDY*) output of gate 529 going low, which causes FTU microprocessor 209 to enter a wait state (see Intel 8080 System User's Manual). When application system 210 completes the read or write to Common Memory 221, the TSMREQ* signal would go high allowing the output of gate 522 to go high resulting in the FTU control (FCNTL*) output of gate 527 going low. The presence of the FCNTL* signal indicates that FTU 206 is in control of Common Memory 221. Additionally, the low signal on lead FCNTL* is inverted by gate 502 and coupled with the address signal on lead F24K* activates gate 505 which turns on gate 504 causing the board select lead BS1* to go low thereby enabling the 3K Common Memory 221. It can be easily seen from this example that if the situation were reversed and FTU 206 had control of the memory (FCNTL* were low) after which application system 210 attempted to access Common Memory 221, the application system ready signal (lead TSRDY* gate 526) would switch low causing application system 210 to enter a wait state.

Arbiter control of 4K Mimic Memory 215 differs slightly from that of Common Memory 221 in that the address select logic of Mimic Memory 215 is programmable. FTU microprocessor 209 writes the starting address of the 4K block to be mimicked into the upper 4 bits of latch 531. When Mimic Memory 215 is enabled by Matchers 208 the Mimic Memory Control lead (MMC) will go high enabling the comparator 532. Should application system microprocessor 212 address the 4K block of memory being mimicked, the Mimic Memory Select (MMS) output of comparator 532 will go high. If application system microprocessor 212 executes a write to memory at this address, the TSMREQ* output of gate 513 will go low requesting control of the memory. When Arbiter 500 grants control and lead TSCNTL* switches low, granting memory control to application system 210, the Board Select Two (BS2*) output of gate 508 will go low enabling the 4K byte Mimic Memory 215. Thus, in addition to writing its own memory, application system microprocessor 212 will write data into Mimic Memory 215.

The variability of the address of Mimic Memory 215 with respect to the address space of application system 210 requires that FTU 206 access Mimic Memory 215 in a slightly different manner than it does Common Memory 221. FTU 206 considers the 4K of Mimic Memory 215 as part of its own memory, residing in the 24K to 28K block of memory mapped I/O address space. When FTU 206 accesses an address in this block the signal on lead F24K* will go low causing an FMREQ* signal to be generated by gate 517 as previously described. Subsequent granting of memory control to FTU 206 is also described above.

Once FTU microprocessor 209 or application system microprocessor 212 is placed in control of Common Memory 221 or Mimic Memory 215 by Arbiter 500, the multiplexing circuitry shown in FIG. 4 will connect the selected microprocessor address data and control lines to the memory. When application system 210 is granted control of Common 221 or Mimic 215 memory the TSCNTL* lead will be low, allowing the tri-state buffer 400 to connect application system 210, address and control leads TAB0–TAB11, TSMEMR, TSMEMW to the memory boards. The BS1* or BS2* lead will enable one of the two memory boards depending on whether Common Memory 221 or Mimic Memory 215 is being accessed. If FTU 206 were granted control of the memory, buffer 499 would be enabled by the FCNTL* signal, placing FTU 206 in control of the memory and connecting FTU, address and control leads AD0–11, FMEMR*, FMRMW*.

The common Memory data bus (CDB) control circuitry must not only allow data flow between application system microprocessor 212 and the memories and FTU microprocessor 209 and the memories, it must also provide a bidirectional data path between application system data bus (TADB) and the FTU data bus (FADB) for FTU access of the application system memory. As previously described, when FTU 206 accesses application system 210 memory, the HOLDACK signal for application system 210 is high and the highest order FTU address bus signal is high (AD15=1). The buffer circuitry on FIG. 4 responds to these control signals by activating gates 485–487 which, in conjunction with an FTU memory read signal on lead FMEMR*, turns on gate 484. Gate 484 on enables buffers 450-458 thereby connecting FTU data bus leads D0-D7 to common data bus leads CD0-CD7. Additionally, gate 484, as in conjunction with the control signal on lead FCNTL*, turns on gate 481 which turns on gate 480 thereby enabling buffers 440-448 which connect application system data bus leads TDB0-TDB7 to common data bus leads CD0-CD7. Thus, the application system data bus is connected to the FTU data bus via buffers 440-448 and 450-458 and FTU 206 can directly read the application system data bus. If FTU 206 is writing the application system memory, control lead FMEMW* would be active and buffers 460-8, 470-8 would be enabled, placing the data from bus FADB onto bus TADB. If FTU 206 is performing a read of the application system memory, buffers 440-8 and 450-8 will be enabled completing a data path from bus TADB to bus FADB.

Thus, through Arbiter 500 and its associated memory control logic, FTU 206 can load a program segment sent from time shared minicomputer 103 into Common Memory 221 where it can be executed by application system 210. Execution of the program segment stored in Common Memory 221 is initiated through use of the IHIGH interrupt as previously described. When FTU 206 activates this interrupt via control latch 600 on the Sanity and Receiver circuit 213, execution of the program segment stored in Common Memory 221 is random with respect to the rest of the application system's software. That is, no matter what point application system 210 is in its resident program, when it gets the interrupt it will branch immediately to Common Memory 221 and begin executing the program stored there.

The code segment stored in Common Memory 221 may be integrated into the application system's software package through use of the Matcher circuit 208 provided in the FTU. Matcher circuit 208 enables the user to designate a specific address in the application system's program at which the IHIGH interrupt will be exerted causing the application system to branch to its code stored in Common Memory 221. Upon completion, the Common Memory resident code may branch to any point in the application system's program. This mechanism enables the user to temporarily insert new code or replace code presently in the application system's ROM memory. Through this approach program patches may be exercised on an application system 210 in the field before they are implemented as a permanent system software change.

In addition to being used to provide the aforementioned patching capability, the common memory feature of FTU 206 is used to allow application system 210 bus access to a utility executive program which it executes under control of the FTU Matcher circuit 208.

FTU FROM PROGRAMMER 1301

FTU PROM Programmer 1301 provides the capability to program PROMs with data downloaded from time-shared minicomputer 103, or entered manually from FTU keyboard terminal 204.

FTU microprocessor 209, acting as the controller, buffers the source data, blank checks the object PROM, performs the programming operation, verifies the programmed device, and issues appropriate messages concerning status of the procedures.

Figure 13:
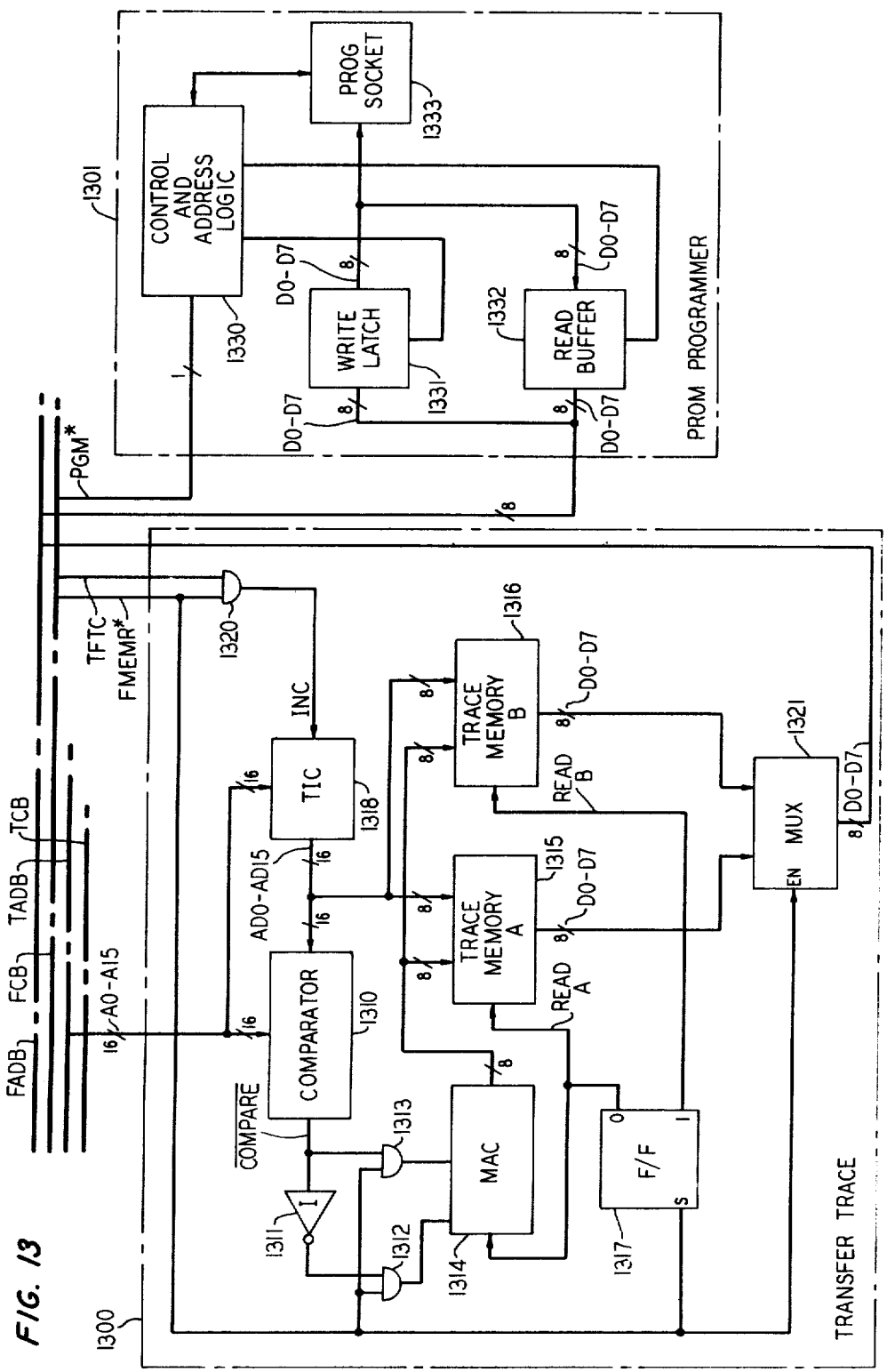

The diagram in FIG. 13 illustrates the actual hardware involved. Although the example shown is intended for programming 2708 type PROMs, the circuit may be modified to program a variety of devices.

Once source data has been received, and its accuracy verified by FTU microprocessor 209, the device to be programmed is blank checked to assure that an unprogrammed PROM has been inserted in programming socket 1333. When the blank check is complete, the program cycle will begin.

A single program cycle consists of a write operation to enter data in write latch 1331. The microprocessor write strobe simultaneously initiates a timing sequence in control logic 1330 which sets hardware busy flag for FTU microprocessor 209 to monitor, and begins the actual programming operation for that byte of data. Write latch 1331 retains the data for the duration of a program sequence. When the sequence is complete, the busy flag is cleared. FTU microprocessor 209 again writes a byte of data, initiating the next program sequence. This process is repeated until the programming requirements for the particular PROM being used are satisfied.

Upon completion of the entire programming cycle, FTU microprocessor 209 will switch the hardware to the read mode by enabling read buffer 1332 and verify every PROM location against the original source data. If the PROM verifies, the next block of data is automatically requested from the source. If the verification fails, the hardware will immediately recycle to allow the user to program another PROM with the same source data.

The devices from which programmer 1301 is constructed are noncritical. That is to say that most of the integrated circuits may be replaced by functionally similar devices. Write latch 1331 may be any device or devices which provide the ability to retain 8 bits of data until cleared or rewritten. The outputs of these devices must be capable of being disabled (three-state) when necessary. For the programmer circuit illustrated in FIG. 13, an Intel Corp. 8212 was used for this purpose. Read buffer 1332 needs only the ability to disable its outputs, and any general purpose three-state device such as the Intel Corp. 8212 or a Texas Instrument 74LS244 may be used.

The address counter must provide a sufficient number of outputs to match the number of address leads required for a given PROM. It need not be synchronous, but must be clearable, or loadable to all zeroes.

Other timing and control logic must be tailored to the PROMs being programmed. The "handshaking" approach which provides the busy flag for the microprocessor, mimimizes the amount of complex timing and sequencing logic required to complete the programmer.

FTU PROCESSOR CIRCUIT—FIGS. 8 AND 9

Figure 7:
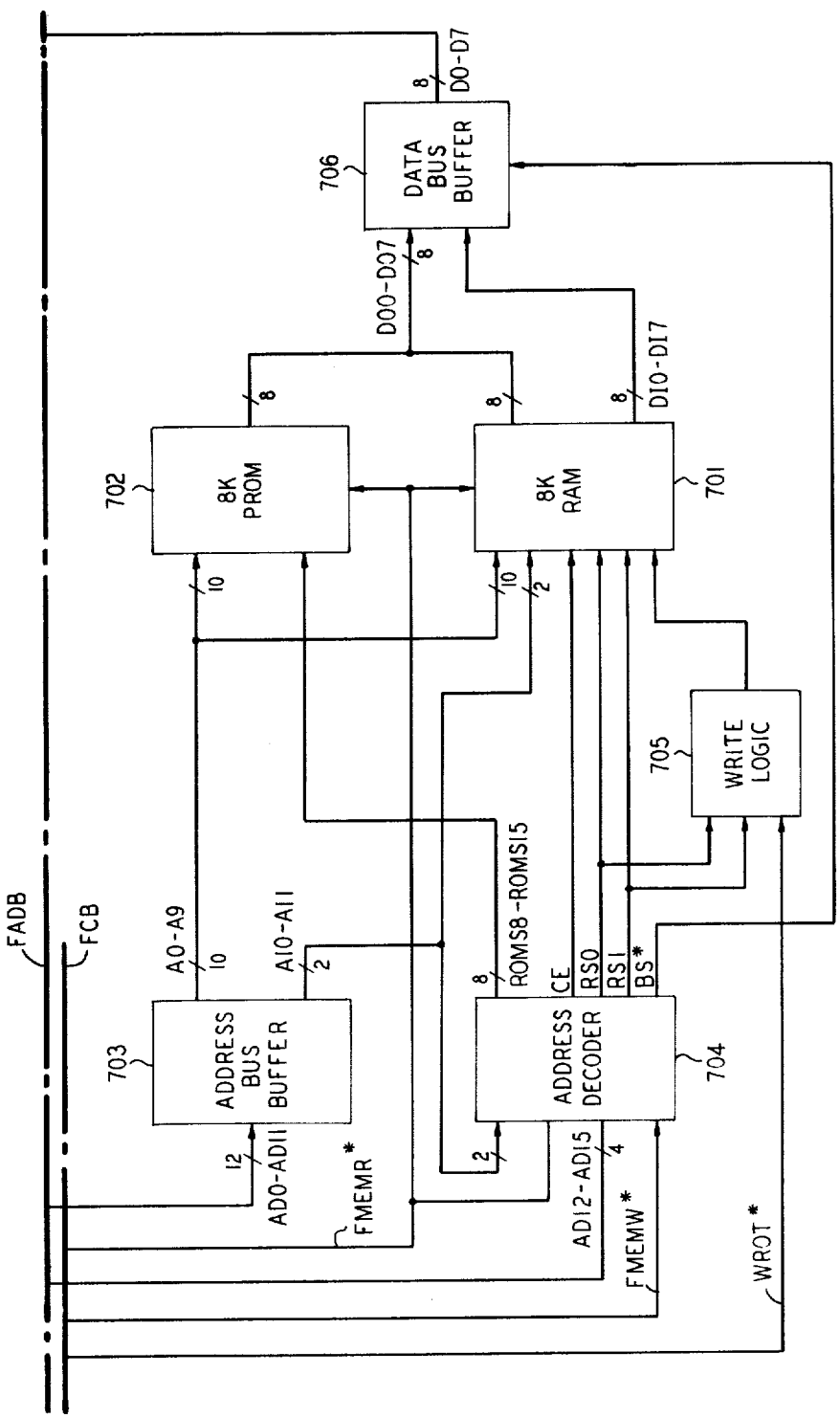
Figure 8:
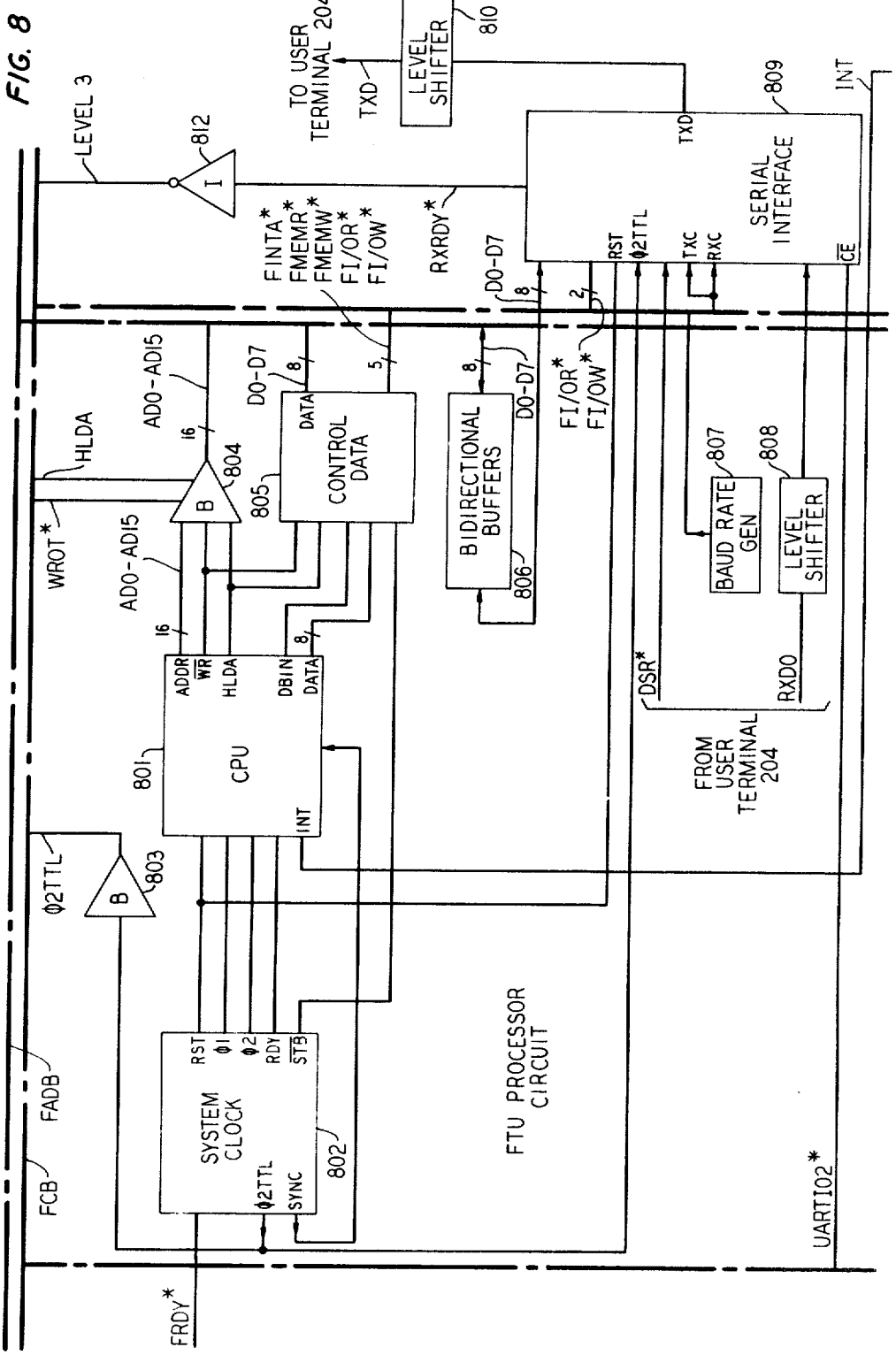
Figures 9, 22:
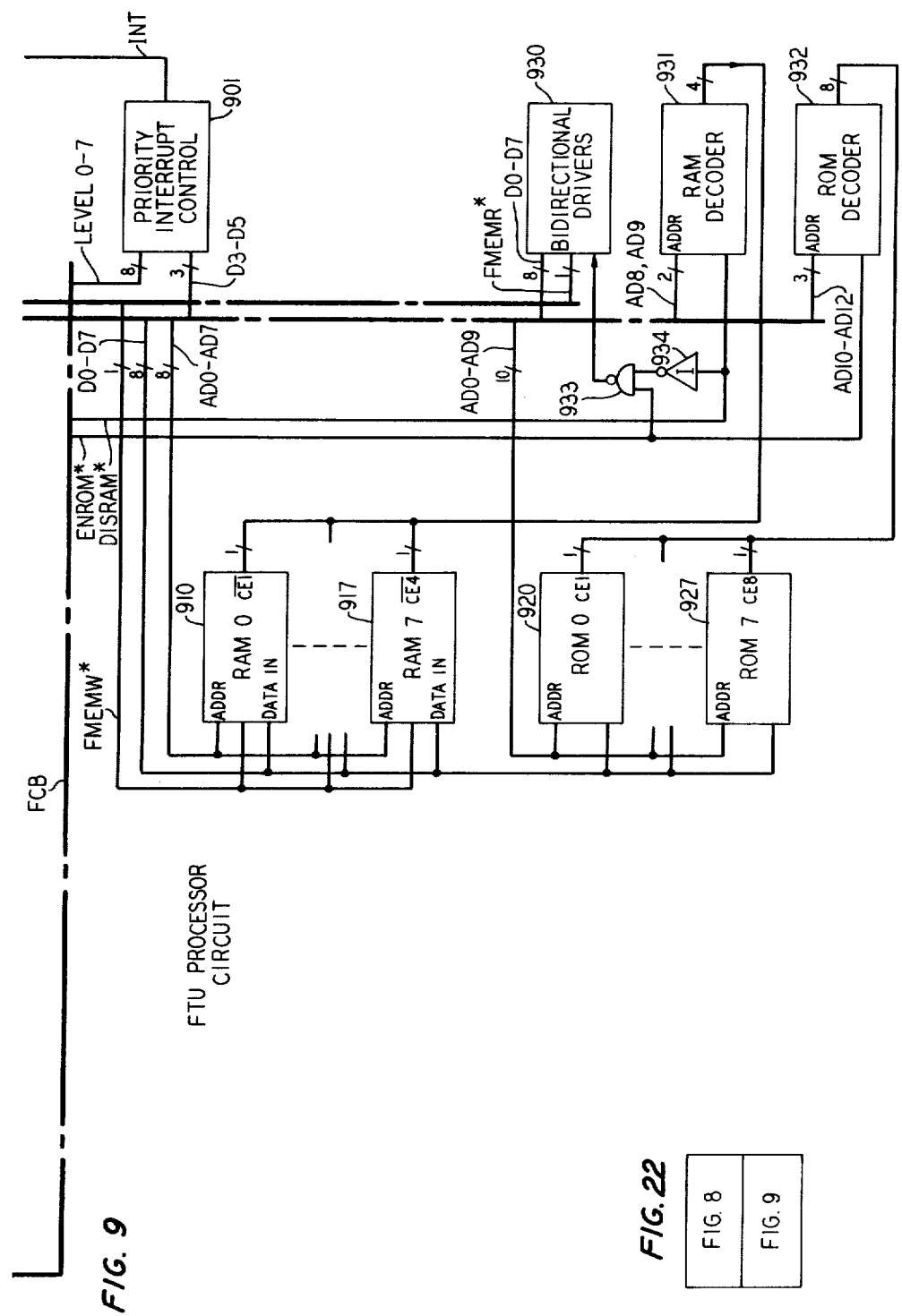

As previously mentioned FTU 206 is controlled by an 8-bit stored program controller. This controller is built around the Intel type 8080 microprocessor 209, and its associated Intel type 8224 clock 802, Intel 8238 bus controller 805 and Intel 8214 interrupt controller, as illustrated in FIGS. 8 and 9. (Reference Intel 8080 Microcomputer Systems User's Manual). The microprocessor uses 16 Intel 2708 PROMS to provide its 16K byte to program store. Eight Intel type 2101-1 RAMS and sixteen type 9130 RAMS provide the microprocessor with 9K of buffer and variable storage memory. The controller is implemented on two circuit packs. The first circuit pack contains the Intel 8080 microprocessor 801, eight type 2708 PROMS 920-927 (8K of PROM), eight type 2101-1 RAMS 910-917 (1K of RAM) and a serial EIA Interface 807-810. The block memory address decoding for the PROM and RAM is performed by address decoding logic 493 on FIG. 4. The Disable RAM (DISRAM) and Enable ROM (ENROM) signals are gated to place the 8K of ROM from 0 to 8K in FTU Memory Space (see FTU Memory Map FIG. 15) and the 1K of RAM in the FTU 31-32K address space. The second circuit pack used to implement the controller is the FTU Program Store board 207. FIG. 7 is a block diagram of the Program Store board, which contains the remaining 8K of ROM and 8K of RAM used by the controller. All address decoding for the 8K of PROM and 8K of RAM is performed on the board by the address decoder. The PROM occupies the 8 to 16K block of FTU memory and the RAM occupies the 16-24K block (see FTU Memory Map FIG. 15).

Directives input to the FTU via the local keyboard terminal 204 will cause the local terminal interface 404 to interrupt FTU microprocessor 209. FTU microprocessor 209 will compare the user input to its set of commands if the input is a member of the set, FTU 206 will proceed to perform the directive. If the input is not a member of the command set FTU 206 will send an error message to the user. For example, if the user desired to read a location in memory of application system 210, he would enter the Debug directive "DB". FTU 206 would respond with a "DB$" prompt and wait for the use to input the symbolic label or absolute address of the memory location. If the user inputs a symbolic name, FTU microprocessor 209 will search its local symbol table for the label entry and its absolute address. If the label is not found, FTU microprocessor 209 will transmit the symbol label to time-shared minicomputer 103 (via the data link 225) and request that time-shared minicomputer 103 supply the absolute value. When the absolute address of the memory location is found, FTU 206 will begin executing a program to read application system 210 memory. First, application system 210 will be placed in the HOLD mode as previously described, allowing the FTU 206 to take command of its address, data and control buses TADB, TCB. The FTU will read the specified memory location, after which it will remove its Hold request to application system 210. FTU microprocessor 209 will then display to the user the absolute address of the memory location and its contents.

We claim:

1. A processor support system for providing maintenance and software development for an application system which is controlled by an application processor via data, address, and control buses, wherein said processor support system comprises:
   computer means for running an operating system to generate and store software for said application system;
   field test unit means connected between said computer means and said application system for interfacing said computer means with said application system, wherein said field test unit means comprises:
   program store means for storing control instructions generated by said computer means for regulating the operation of said field test unit means;
   processor means for controlling the operation of said application system;
   memory means for storing said software generated by said computer means and written in said memory means by said computer means;
   interface means responsive to said processor means and directly connectable to said application system data, address, and control buses for connecting said application processor to said memory means;
   field test unit bus means connected to said program store means and to said processor means for applying said control instructions to said processor means; and
   wherein said processor means is responsive to said control instructions for directing said application processor via said interface means to execute said software stored in said memory means.

2. The invention of claim 1 wherein said field test unit means includes:
   terminal means for providing an engineer with data access to said processor support system;
   access means for transmitting input data from said terminal means on said data link to said computer means; and
   wherein said computer means are responsive to said input data to generate application software for said application system.

3. The invention of claim 1 wherein said interface means includes:
   supervision means responsive to said processor means and connected to said application system data, address, and control bus for monitoring and driving said application system data, address, and control bus.

4. The invention of claim 3 wherein said supervision means includes transfer trace means connected to said interface means and responsive to signals appearing on said application system data, address, and control bus for storing data representative of the program branches taken by said application processor in the execution of said application software.

5. The invention of claim 3 wherein said supervision means includes:
   matcher means connected to said field test unit data, address, and control bus means and responsive to programming signals applied to said field test unit data, address, and control bus means by said processor means for storing said programming signals; and
   wherein said matcher means are connected to said interface means and are responsive to signals appearing on said application system data bus for generating a match indication signal whenever said signals appearing on said application system data are identical to said programming signals stored in said matcher means.

6. The invention of claim 5 wherein said matcher means includes Nth pass counter means responsive to said programming signals for storing a count indication;
   wherein said matcher means decrements said count indication stored in said Nth pass counter means whenever said signals appearing on said application system data bus are identical to said programming signals stored in said matcher means; and
   wherein said matcher means generates an Nth pass match indication signal when said count indication stored in said Nth pass counter means equals zero.

7. The invention of claim 6 wherein said supervision means includes:

elapsed time clock means responsive to said match indication signal for indicating the amount of real time elapsed between subsequent appearances of said match indication signal.

8. The invention of claim 3 wherein said supervision means includes:
   buffer means connected to said application system data, address, and control buses for transmitting all signals appearing on said application system data, address, and control buses to said access means; and
   wherein said access means is additionally responsive to said buffer means for transmitting said signals appearing on said application system data, address, and control buses to said computer means via said data link for storage.

9. The invention of claim 1 wherein said computer means includes a time-shared computer connectable to a plurality of field test unit means.

10. The invention of claim 9 wherein said computer means is remotely located from said application system and said field test unit means; and wherein said access means comprises a data modem.

11. A processor support system for providing hardware debugging and software development capabilities for an application system which contains both a memory device and an application processor which processor drives data, address, and control buses of said application system, wherein said microprocessor support system comprises:
   computer means responsive to control signals input from a user terminal for running an operating system to generate control instructions and to manipulate data;
   field test unit means connected to said computer means by a data link and directly connected to said application system for ordering the flow of said data between said computer means and said application system;
   wherein said field test unit means includes:
   field test unit data, address, and control bus means for interconnecting the various circuits of said field test unit means;
   program store means connected to said field test unit data, address, and control bus means for storing said control instructions generated by said computer means to regulate the operation of said field test unit means;
   data receiver means connected to both said data link and said field test unit data, address, and control bus means, wherein said data receiver means are responsive to said computer means transmitting said control instructions to said field test unit means via said data link for writing said control instructions into said program store means via said field test unit data, address, and control bus means;
   processor means connected to said field test unit data, address, and control bus means and responsive to said control instructions stored in said program store means for driving said field test unit data, address, and control bus means;
   memory means connected to said field test unit data, address, and control bus means for storing data generated by said application system;
   interface means connected to said field test unit data, address, and control bus means and directly connectable to said application system data, address, and control buses for providing bidirectional data transfer between said application system data, address, and control buses and said memory means via said field test unit data, address, and control bus means in response to control signals transmitted to said processor means to said interface means via said field test unit data, address, and control bus means; and
   data transmission means connected to both said data link and said field test unit data, address, and control bus means and responsive to said processor means for transmitting said data from said memory means to said computer via said data link.

12. The invention of claim 11 wherein said field test unit means includes transceiver means responsive to said processor means for transmitting data stored in said memory means to said computer means via said data link and for receiving data transmitted by said computer means via said data link.

13. The invention of claim 12 wherein said field test unit means includes:
   terminal means for providing an engineer with data access to said field test unit; and
   input means connected to said field test unit data, address, and control bus means and responsive to input data entered into said terminal means for storing said input data in said memory means.

14. The invention of claim 11 wherein said processor means is responsive to said control instructions for concurrently enabling the transfer of data between said interface means and said memory means and between said memory means and said computer means.

15. The invention of claim 11 wherein said interface means is responsive to said processor means for reading the contents of said application system memory onto said field test unit address, data, and control bus means.

16. The invention of claim 15 wherein said processor means is additionally responsive to said control instructions for regulating the operation of said application processor by driving said control bus of said application processor via said interface means.

17. The invention of claim 15 wherein said field test unit means includes buffer means for connecting said field test unit data, address, and control bus means to said transceiver means for transmitting said contents of said application system memory appearing on said field test unit data, address and control bus means to said computer means via said data link.

18. The invention of claim 16 wherein said interface means is responsive to said processor means for halting the operation of said application processor.

* * * * *